US012224507B2

(12) United States Patent
Wang et al.

(10) Patent No.: US 12,224,507 B2
(45) Date of Patent: Feb. 11, 2025

(54) ANTENNA AND DISPLAY APPARATUS

(71) Applicants: Beijing BOE Technology Development Co., Ltd., Beijing (CN); BOE Technology Group Co., Ltd., Beijing (CN)

(72) Inventors: Yali Wang, Beijing (CN); Feng Qu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/760,258

(22) PCT Filed: Nov. 17, 2021

(86) PCT No.: PCT/CN2021/131071

§ 371 (c)(1),
(2) Date: Aug. 5, 2022

(87) PCT Pub. No.: WO2023/087162

PCT Pub. Date: May 25, 2023

(65) Prior Publication Data

US 2024/0186703 A1 Jun. 6, 2024

(51) Int. Cl.
*H01Q 9/04* (2006.01)
*H01Q 1/22* (2006.01)

(52) U.S. Cl.
CPC ............. *H01Q 9/0428* (2013.01); *H01Q 1/22* (2013.01); *H01Q 9/04* (2013.01)

(58) Field of Classification Search
CPC ........... H01Q 9/0428; H01Q 1/22; H01Q 9/04
See application file for complete search history.

(56) References Cited

U.S. PATENT DOCUMENTS

| | | | | |
|---|---|---|---|---|
| 4,899,164 A * | 2/1990 | McGrath | H01Q 21/0018 | 343/754 |
| 5,216,430 A * | 6/1993 | Rahm | H01Q 21/065 | 343/846 |
| 7,253,770 B2 * | 8/2007 | Yegin | H01Q 9/0421 | 343/700 MS |

FOREIGN PATENT DOCUMENTS

| | | |
|---|---|---|
| CN | 2533634 Y | 1/2003 |
| CN | 202797299 U | 3/2013 |

(Continued)

OTHER PUBLICATIONS

International Search Report & Written Opinion mailed Mar. 3, 2022, regarding PCT/CN2021/131071.

(Continued)

*Primary Examiner* — Hai V Tran
(74) *Attorney, Agent, or Firm* — Intellectual Valley Law, P.C.

(57) ABSTRACT

An antenna is provided. The antenna includes a ground plate, and a slot extending through the ground plate; a first dielectric layer on the ground plate and the slot; a microstrip feed line and a first radiating patch on a side of the first dielectric layer away from the ground plate, the first radiating patch being coupled to the microstrip feed line and configured to receive a signal from the microstrip feed line; a second dielectric layer on a side of the ground plate and the slot away from the first dielectric layer, the first radiating patch, and the microstrip feed line; and a second radiating patch on a side of the second dielectric layer away from the ground plate, the second radiating patch being configured to receive a signal by aperture coupling through the slot.

19 Claims, 37 Drawing Sheets

(56) References Cited

FOREIGN PATENT DOCUMENTS

| | | | |
|---|---|---|---|
| CN | 104466366 | A | 3/2015 |
| CN | 111697329 | A | 9/2020 |
| CN | 112582789 | A | 3/2021 |
| CN | 112768882 | A | 5/2021 |
| CN | 112986918 | A | 6/2021 |
| EP | 2369677 | A1 | 9/2011 |
| JP | 2000114859 | A | 4/2000 |

OTHER PUBLICATIONS

Y. Gou et al., "A Compact Dual-Polarized Double E-Shaped PAtch Antenna with High Isolation IEEE Transaction on Antennas and Propagation", May 13, 2013, No. 8, vol. 61.

Zhang et al., "Bidirectional Circularly Polarized Microstrip Antenna Fed by Coplanar Waveguide", 2006 7th International Symposium on Antennas, Propagation & EM Theory.

Li et al., "Design of Wideband Bi-directional Microstrip Antenna", Journal of Microwaves, vol. 29 No. 2, Apr. 2013, English Translation of Abstract attached.

* cited by examiner

ANTENNA AND DISPLAY APPARATUS

CROSS-REFERENCE TO RELATED APPLICATION

This application is a national stage application under 35 U.S.C. § 371 of International Application No. PCT/CN2021/131071, filed Nov. 17, 2021, the contents of which are incorporated by reference in the entirety.

TECHNICAL FIELD

The present invention relates to an antenna and a display apparatus.

BACKGROUND

Circular polarization of an antenna refers to the polarization of a radiofrequency signal that is split into two equal amplitude components that are is phase quadrature and are spatially oriented perpendicular to each other and to the direction of propagation.

SUMMARY

In one aspect, the present disclosure provides as antenna, comprising a ground plate, and a slot extending through the ground plate; a first dielectric layer on the ground plate and the slot; a microstrip feed line and a first radiating patch on a side of the first dielectric layer away from the ground plate, the first radiating patch being coupled to the microstrip feed line and configured to receive a signal from the microstrip feed lie; s second dielectric layer on a side of the ground plate and the slot away from the first dielectric layer, the first radiating patch and the microstrip feed line; and a second radiating patch on a side of the second dielectric layer away how the ground plate, the second radiating patch being configured to receive s signal by aperture coupling through the slot.

Optionally, the first radiating patch has a first parallelogram shape with a first notch and a second notch truncating two corners of the first parallelogram shape on two opposite sides of a first diagonal bine, respectively; the second radiating patch has a second parallelogram shape with a third notch and a fourth notch truncating two corners of the second parallelograms shape on two opposite sides of a second diagonal line, respectively; and the first diagonal line and the second diagonal line cross over each other.

Optically, corners of the first parallelogram shape along the second diagonal line remain untruncated; and corners of like second parallelogram shape along the first diagonal line remain untruncated.

Optionally, the first parallelogram shape has first truncated sides along the first notch and the second notch, respectively; the second parallelogram shape has second truncated sides along the third notch and the fourth notch, respectively; and a length of a respective first truncated side is smaller than a length of a respective second truncated side.

Optionally, the length of the respective first truncated side is smaller than the length of the respective second truncated side by 5% to 35%.

Optionally, the first parallelogram shape with the first notch and the second notch are a first square shape with the first notch and the second notch; and the second parallelogram shape with the third notch and the fourth notch are a second square shape with the third notch and the fourth notch.

Optionally, along a first direction, a first maximum width of the first parallelogram shape is greater than a second maximum width of the second parallelogram shape; and along a second direction perpendicular to the first direction, a fast maximum length of the first parallelograms shape is greater than's second maximum length of the second parallelogram shape.

Optionally, the first maximum width is greater than the second maximum width by 0.1% to 10%; and the first maximum length is greater than the second maximum length by 0.1% to 10%.

Optionally, along a first direction, the slot has a maximum slot width; along a second direction perpendicular to the first direction, the slot has a maximum slot length; and a ratio of the maximum slot width to the maximum slot lengths is in a range of 4:1 to 1.5:1.

Optionally, the first radiating patch has a first parallelogram shape with a first notch and a second notch truncating two corners of the first parallelogram shape on two opposite sides of a first diagonal line, respectively; the second radiating patch has a second parallelograms shape with a third notch and a fourth notch truncating two corners of the second parallelograms shape on two opposite sides of a second diagonal line, respectively; along the fast direction, a ratio of the maximum slot width to a first maximum width of the first parallelogram shape or to a second maximum width of the second parallelogram shape is in a range of 1:1.5 to 1:2.5; and along the second direction, a ratio of the maximum slot length to a fast maximum length of the first parallelogram shape or a second maximum length of the second parallelogram shape is in a range of 1:2.5 to 1:6.5.

Optionally, the antenna further comprises an impedance transformation line configured to perform impedance matching; wherein the impedance transformation line connects the microstrip feed line to the first radiating patch.

Optionally, the impedance transformation line has a rectangular shape.

Optionally, the impedance transformation line has a first side connected to the microstrip feed line, a second side connected to the best radiating patch, and a third side and a fourth side between the first side and the second side; and the third side and the first side, the third side and the second side, the fourth side and the first side, the fourth side and the second side, are connected by curved sides.

Optionally, the microstrip feed line is directly connected to the first radiating patch without an impedance transformation line.

Optionally, the dot has a rectangular shape.

Optionally, the slot has a rectangular shape with round corners.

Optionally, the slot has a shape comprising, sequentially along a first direction, a first rectangular shape, a first trapezoidal shape, a second trapezoidal shape, and a second rectangular shape; short sides of the first trapezoidal shape and the second trapezoidal shape are connected to each other; and along a second direction perpendicular to the first direction lengths of the first rectangular shape and the second rectangular shape are substantially the same as lengths of long sides of the first trapezoidal shape and the second trapezoidal shape.

Optionally, the slot has a shape comprising, sequentially along a first direction, a first rectangular shape, a second rectangular shape, and a third rectangular shape; and along a second direction perpendicular to the first direction, a length of the second rectangular shape is smaller than a length of the first rectangular shape and smaller than a length of the third rectangular shape.

Optionally, orthographic projectors of corners of the first parallelogram shape along the second diagonal line on the first dielectric layer is at least partially non-overlapping with an orthographic projection of the second parallelogram shape on the first dielectric layer, and orthographic projections of corners of the second parallelogram shape along the first diagonal line on the first dielectric layer is at least partially non-overlapping with an orthographic projection of the first parallelogram shape on the first dielectric layer.

Optionally, an orthographic projection of the slot on the first dielectric layer covers a center of as orthographic projection of the first radiating patch on the first dielectric layer; and the orthographic projection of the slot on the first dielectric layer covers a center of aw orthographic projection of the second radiating patch on the first dielectric layer.

Optionally, the antenna is configured to be a night-handed circularly polarized antenna with bidirectional radiation.

In another aspect, the present disclosure provides an electronic apparatus comprising the antenna described herein.

BRIEF DESCRIPTION OF THE FIGURES

The following drawings are merely examples for illustrative purposes according to various disclosed embodiments and are not intended to limit the scope of the present invention.

FIG. 23 illustrates a right-handed polarization gain curve of the antenna depicted in FIG. 20A.

FIG. 33E illustrates the structure of a first dielectric layer in an antenna depicted in FIG. 32A.

DETAILED DESCRIPTION

The disclosure will now be described more specifically with reference to the following embodiments. It is to be noted that the following descriptions of some embodiments are presented herein for purpose of illustration and description coly. It is not intended to be exhaustive or to be limited to the precise form disclosed.

The present disclosure provides, inter alia, as antenna and a display apparatus that substantially obviate one or more of the problems due to limitations and disadvantages of the related art. In one aspect, the present disclosure provides an antenna. In some embodiments, the antenna includes a ground plate, and a slot extending through the ground plate; a first dielectric layer on a first side of the ground plate and the slot, a microstrip feed line and a first radiating patch on a side of the first dielectric layer away from the ground plate, the first radiating patch being coupled to the microstrip feed line and configured to receive a signal from the microstrip feed line; a second dielectric layer on a second side of the ground plate and the slot; and a second radiating patch on a side of the second dielectric layer away from the ground plate, the second radiating patch being configured to receive a signal by aperture coupling through the slot.

Figure 1A:
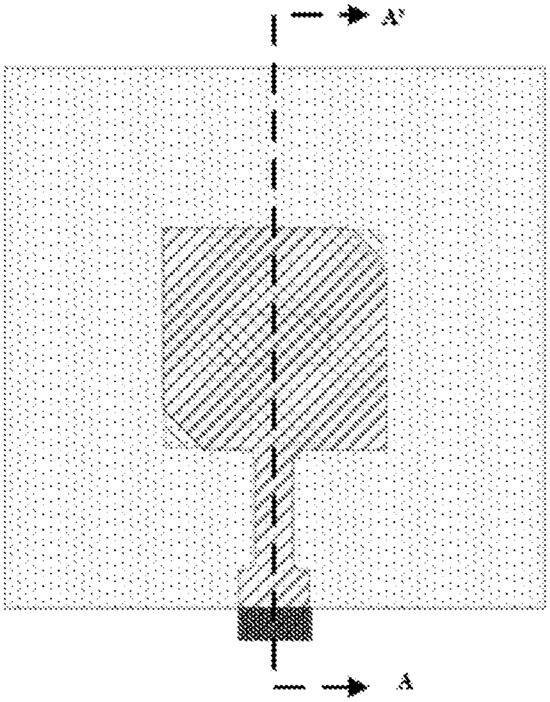
FIG. 1A is a plan view of ax antenna in some embodiments according to the present disclose.
Figure 1B:
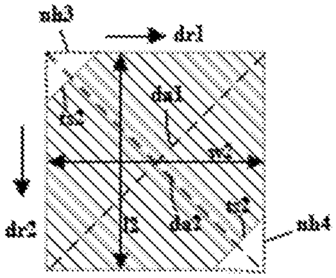
FIG. 1B illustrates the structure of a second radiating patch in an antenna depicted in FIG. 1A.
Figure 1C:
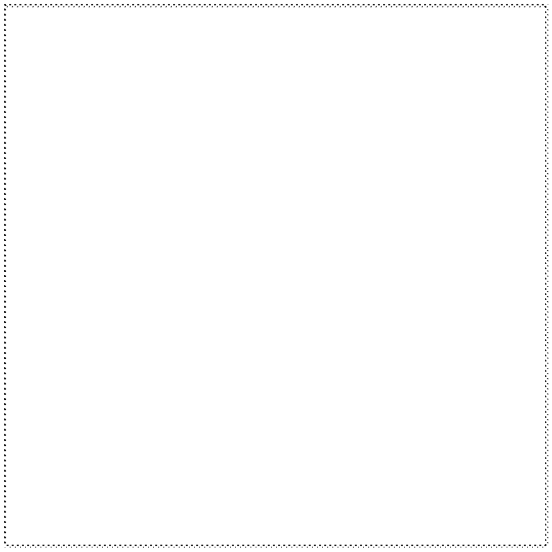
FIG. 1C illustrates the structure of a second dielectric layer in an antenna depicted in FIG. 1A.
Figure 1D:
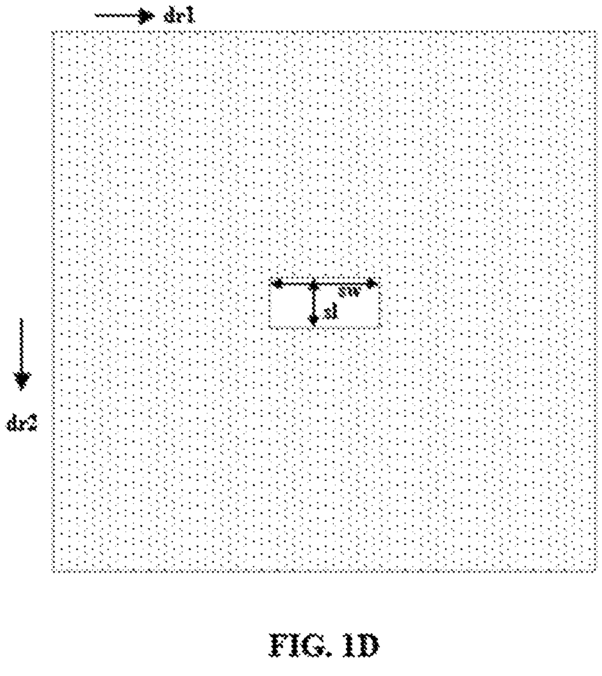
FIG. 1D illustrates the structure of a ground plate is ax antenna depicted in FIG. 1A.
Figure 1E:
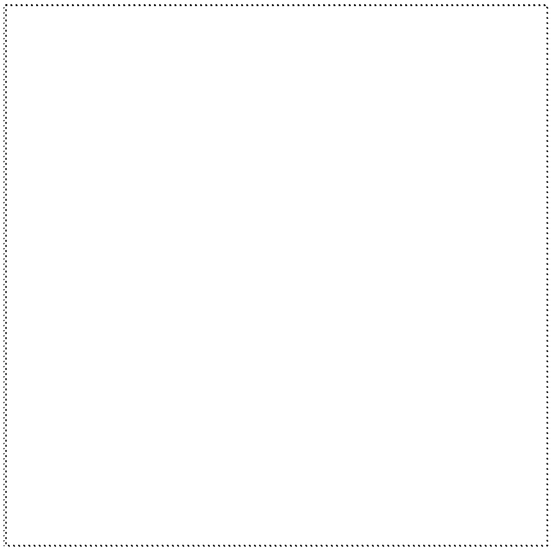
FIG. 1E illustrates the structure of a first dielectric layer in an antenna depicted in FIG. 1A.
Figure 1F:
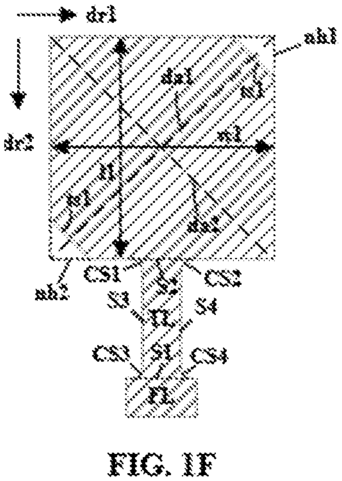
FIG. 1F illustrates the structure of a microstrip feed line and a first radiating patch in an antenna depicted in FIG. 1A.
Figure 2:
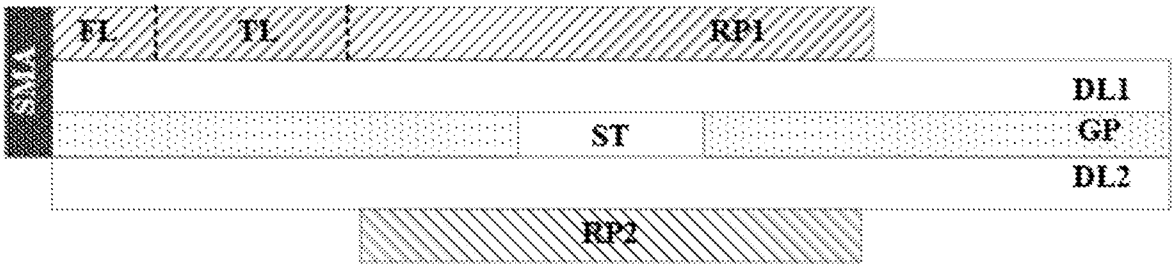
FIG. 2 is a cross-sectional view of an antenna in some embodiments according to the present disclosure.

FIG. 1A is a plan view of an antenna in some embodiments according to the present disclosure. FIG. 1B illustrates the structure of a second radiating patch in an antenna depicted in FIG. 1A. FIG. 1C illustrates the structure of a second dielectric layer in an antenna depicted in FIG. 1A. FIG. 1D illustrates the structure of a ground plate in an antenna depicted in FIG. 1A. FIG. 1E illustrates the structure of a first dielectric layer in an antenna depicted in FIG. 1A. FIG. 1F illustrates the structure of a microstrip feed line and a first radiating patch in an antenna depicted in FIG. 1A. FIG. 2 is a cross-sectional view of an antenna in some embodiments according to the present disclosure. FIG. 2 illustrates a cross-section view, for example, along an A-A' line in FIG. 1A, or along a B-B' line in FIG. 3A, or along a C-C' line in FIG. 4A, or along a D-D' line in FIG. 5A, or along a E-E' line in FIG. 6A. Referring to FIG. 1A to FIG. 1F, and FIG. 2, the antenna in some embodiments includes a ground plate GP, and a slot ST extending through the ground plate; a first dielectric layer DL1 on the ground plate GP and the slot ST; a microstrip feed line FL and a first radiating patch RP1 on a side of the first dielectric layer DL1 away from the ground plate GP, the first radiating patch RP1 being coupled to the microstrip feed line FL; a second dielectric layer DL2 on a side of the ground plate GP and the slot ST away from the first dielectric layer DL1, the first radiating patch RP1, and the microstrip feed line FL; and a second radiating patch RP2 on a side of the second dielectric layer DL2 away from the ground plate GP.

As shown in FIG. 2, an orthographic projection of the first radiating patch RP1 on the first dielectric layer DL1 covers an orthographic projection of the slot ST on the first dielectric layer DL1, and an orthographic projection of the second radiating patch RP2 on the first dielectric layer DL1 covers the orthographic projection of the slot ST on the first dielectric layer DL1. In the present antenna, the first radiating patch RP1 is configured to receive a signal from the microstrip feed line FL, the second radiating patch RP2 is configured to receive a signal by aperture coupling through the slot ST. For example, the second radiating patch RP2 is activated by the first radiating patch RP1 through aperture coupling. The present antenna is configured to be a right-handed circularly polarized antenna with bidirectional radiation.

In some embodiments, the antenna further includes a radio-frequency connector SMA configured to receive an external radio-frequency signal. The radio-frequency connector SMA is connected to the microstrip feed line FL, and coupled to the first radiating patch RP1 through the microstrip feed lose FL.

In some embodiments, the antenna further includes impedance transformation line TL configured to perform impedance matching. The impedance transformation line TL connects the microstrip feed line FL to the first radiating patch RP1.

Referring to FIG. 1F, the first radiating patch RP1 has a first parallelograms shape with a first notch and a second notch nh2 truncating two corners of the first parallelogram shape on two opposite sides of a first diagonal line da1, respectively. Referring to FIG. 1B, the second radiating patch RF2 has a second parallelograms shape with a third notch nh3 and a fourth notch nb4 truncating two corners of second the parallelogram shape on two opposite sides of a second diagonal line da1, respectively. Optionally, the first diagonal line da1 and the second diagonal fine da1 cross over each other. In one example, the first diagonal line da1 and the second diagonal line da1 are perpendicular to each other.

Referring to FIG. 1F, is some embodiments, corners of the first parallelogram shape along the second diagonal line da remain untruncated. Referring to FIG. 1B, in some embodiments, corners of the second parallelogram shape along the first diagonal line da1 remain untruncated. Referring to FIG. 1A, FIG. 1B, FIG. 1F, and FIG. 2, in some embodiments, orthographic projections of corners of the first parallelogram shape along the second diagonal line da1 on the first dielectric layer DL1 is at least partially wow-overlapping with an orthographic projection of the second parallelogram shape on the first dielectric layer DL1; and orthographic projections of corners of the second parallelogram shape along the first diagonal line da1 on the first dielectric layer DL1 is at least partially non-overlapping with an orthographic projection of the first parallelogram shape on the first dielectric layer DL1. By having a first notch nh1 and a second watch also truncating two corners of the first radiating patch RP1, and a third notch nh3 and a fourth notch why truncating two corners of the second radiating patch RP2, bidirectional radiation can be achieved using the present antenna. In one example, right-handed circularly polarized radiation can be realized is both the forward radiation and the backward radiation.

Because the signal to the first radiating patch RP1 is fed by the microstrip feed line FL whereas the signal to the second radiating patch RP2 is fed by the aperture coupling mechanism, the sizes of the patches and the sines of the notches for the patches are configured differently. As discussed in detail below, the first radiating patch RP1 and the second radiating patch RP2 is the present antenna are made to have a unique structure to the bidirectional radiation with both the forward radiation and the back ward radiation being right-handed circularly polarized radiation.

In some embodiments, referring to FIG. 1B and FIG. 1F, the first parallelogram shape has fast truncated sides ts1 along the first notch nh1 and the second notch nh2, respectively; the second parallelogram shape has second truncated sides ts2 along the third notch nh3 and the fourth notch nb4, respectively. To achieve the right-handed circularly polarised bidirectional radiation, in some embodiments, a length of a respective first truncated side is smaller than a length of a respective second truncated side. Optionally, the length of the respective first truncated side is smaller than the length of the respective second truncated side by 5% to 35%, e.g., 5% to 10%, 10% to 15%, 15% to 20%, 20% to 25%, 25% to 30%, or 30% to 35%. Optionally, the length of the respective first truncated side is smaller than the length of the respective second truncated side by at least 20%.

In one example, the respective first truncated side has a length in a range of 4.0 mm to 5.0 mm, e.g., 4.0 mm to 4.2 mm, 4.2 mm to 4.4 mm, 4.4 mm to 4.6 mm 4.6 mm to 4.8 mm, or 4.8 mm to 5.0 mm. Is another example, the respective first truncated side has a length of 4.67 mm.

In one example, the respective second truncated side has a length is a range of 5.0 www to 7.0 mm, e.g., 5.0 mm to 5.2 mm, 5.2 mm to 5.4 mm, 5.4 mm to 5.6 mm, 5.6 mm to 5.8 mm, 5.8 mm to 6.0 mm, 6.0 mm to 6.2 mm, 6.2 mm to 6.4 mm, 6.4 mm to 6.6 mm, 6.6 mm to 6.8 mm, or 6.8 mm to 7.0 mm. In another example, the respective first truncated side has a length of 5.80 mm.

Various appropriate parallelogram shapes may be implemented in the present radiating patches. In one example, the parallelogram shapes with the notches are rectangles with notches. In another example, the first parallelogram shape with the first notch and the second notch are a first rectangular shape with the first notch and the second notch; and the second parallelogram shape with the third notch and the fourth notch are a second rectangular shape with the third notch and the fourth notch. In another example, the parallelogram shapes with the notches are squares with notches. In another example, the first parallelogram shape with the first notch and the second notch are a first square shape with the first notch and the second notch; and the second parallelogram shape with the third notch and the fourth notch are a second square shape with the third notch and the fourth notch.

The notches may have various appropriate shapes. Examples of appropriate shapes of the notches include a triangular shape, a square shape, a rectangular shape, a L shape, a polygon shape, an irregular polygon shape, and so on.

Because the signals to the first radiating patch RP1 and the second radiating patch RP2 are fed via different mechanisms, the sizes of the patches are configured differently to achieve the right-handed circularly polarized bidirectional radiation. Referring to FIG. 1B and FIG. 1F, along a first direction dr1, a first maximum width w1 of the first parallelogram shape is greater than a second maximum width w2 of the second parallelogram shape; and, along a second direction dr2 perpendicular to the first direction dr1, a first maximum length 11 of the first parallelogram shape is greater than a second maximum length 12 of the second parallelogram shape.

In some embodiments, the first maximum width w1 is greater than the second maximum width w2 by 0.1% to 10%, e.g., by 0.1% to 0.5%, by 0.5% to 1.0%, by 1.0% to 1.5%, by 1.5% to 2.0%, by 2.0% to 2.5%, by 2.5% to 3.0%, by 3.0% to 3.5%, by 3.5% to 4.0%, by 4.0% to 4.5%, by 4.5% to 5.0%, by 5.0% to 5.5%, by 5.5% to 6.0%, by 6.0% to 6.5%, by 6.5% to 7.0%, by 7.0% to 7.5%, by 7.5% to 8.0%, by 8.0% to 8.5%, by 8.5% to 9.0%, by 9.0% to 9.5%, or by 9.5% to 10.0%%. Optionally, the first maximum width is greater than the second maximum width by 2.5% to 3.0%, e.g., by 2.78%.

In some embodiments, the first maximum length 11 is greater than the second maximum length 12 by 0.1% to 101%, e.g., by 0.1% to 0.5%, by 0.5% to 1.0%, by 1.0% to 1.5%, by 1.5% to 2.0%, by 2.0% to 2.5%, by 2.5% to 3.0%, by 3.0% to 3.5%, by 3.5% to 4.0%, by 4.0% to 4.5%, by 4.5% to 5.0%, by 5.0% to 5.5%, by 5.5% to 6.0%, by 6.0% to 6.5%, by 6.5% to 7.0%, by 7.0% to 7.5%, by 7.5% to 8.0%, by 8.0% to 8.5% 9.0%, by 9.0% to 9.5%, or by 9.5% to 10.0%. Optionally, the first maximum lengths 11 is greater than the second maximum length 12 by 2.5% to 3.0%, e.g., by 2.78%.

In one example, the first maximum width w1 is in a range of 15.0 mm to 21.0 mm e.g., 15.0 mm to 15.5 mm, 13.5 mm to 16.0 mm, 16.0 mm to 16.5 mm, 16.5 mm to 17.0 mm, 17.0 mw to 17.5 mm, 17.5 mm to 18.0 mm, 18.0 mm to 18.5 mm, 18.5 mm to 19.0 mm, 19.0 mm to 19.5 mm, 19.5 mm to 20.0 mm, 20.0 mm to 20.5 mm, 20.5 mm to 21.0 mm. Optionally, the first maximum width w1 is in a range of 18.0 mm to 19.0 mm, e.g., 18.5 mm.

In one example, the first maximum length 11 is w a range of 15.0 mm to 21.0 mm, e.g., 15.0 mm to 15.5 mm, 15.5 am to 16.0 mm, 16.0 mm to 16.5 mm, 16.5 mm to 17.0 mm, 17.0 mm to 17.5 mm, 17.5 mm to 18.0 mm, 18.0 mm to 18.0 mm, 18.5 mm to 19.0 mm, 19.0 mm to 19.5 mm, 19.5 mm to 20.0 mm, 20.0 mm to 20.5 mm, 20.5 mm to 21.0 mm. Optionally, the first maximum length 11 is in a range of 18.0 mm to 19.0 mm, e.g., 18.5 mm.

In one example, the second maximum width w2 is in a range of 14.5 mm to 20.5 mm e.g., 14.5 mm to 15.0 mm, 15.0 mm to 15.5 mm, 15.5 mm to 16.0 mm, 16.0 mm to 16.5 mm, 16.5 mm to 17.0 mm, 17.0 mm to 17.5 mm, 17.5 mm to 18.0 mm, 18.0 mm to 18.5 mm, 18.5 mm to 19.0 mm, 19.0 mm to 19.5 mm, 19.5 mm to 20.0 mm, or 20.0 mm to 20.5 mm. Optionally, the second maximum width w2 is in a range of 17.5 mm to 18.5 mm, e.g., 18.0 mm.

In one example, the second maximum length 12 is in a range of 14.5 mm to 20.5 mm, e.g., 14.5 mm to 15.0 mm, 13.0 mw to 15.5 mm, 15.5 mm to 16.0 mm, 16.0 mm to 16.5 mm, 16.5 mm to 17.0 mm, 17.0 mm to 17.5 mm, 17.5 mm to 18.0 mm, 18.0 mm to 18.5 mm, 18.5 mm to 9.0 mm to 19.5 mm, 19.5 mm to 20.0 mm, or 20.0 mm to 20.5 mm.

Optionally, the second maximum length 12 is in a range of 17.5 mm to 18.5 mm, e.g., 18.0 mm.

The inventors of the present disclosure further discover that, surprisingly and unexpectedly, the size, width, length, and/or shape of the slot are also critical in achieving the right-handed circularly polarized bidirectional radiation. In some embodiments, referring to FIG. 1D, along a first direction di, the slot has a maximum slot width sw; along a second direction dr2 perpendicular to the first direction dr1, the slot has a maximum slot length sl. To achieve the right-handed circularly polarized bidirectional radiation, the inventors of the present disclosure discovers that a ratio of the maximum slot width to the maximum slot length optionally is in a range of 4:1 to 1.5:1, e.g., 4:1 to 3.5:1, 3.5:1 to 3:1, 3:1 to 2.5:1, 2.5:1 to 2:1, or 2:1 to 1.5:1. Optionally, the ratio of the maximum slot width to the maximum slot length optionally is in a range of 2.75:1 to 1.75:1, e.g., 2.25:1.

Moreover, the size of the slot with respect to the size of the radiating patch is important is achieving the right-handed circularly polarized bidirectional radiation. In some embodiments, referring to FIG. 1B, FIG. 1D, and FIG. 1F, along the first direction dr1, a ratio of the maximum slot width sw to a first maximum width w1 of the first parallelogram shape or to a second maximum width w2 of the second parallelogram shape is in a range of 1:1.5 to 1:2.5, e.g., 1:1.5 to 1:1.6, 1:1.6 to 1:1.7, 1:1.7 to 1:1.8, 1:1.8 to 1:1.9, 1:1.9 to 1:2.0, 1:2.0 to 1:2.1, 1:2.1 to 1:2.2, 1:2.2 to 1:2.3, 1:2.3 to 1:2.4, or 1:2.4 to 1:2.5. Optionally, the ratio of the maximum slot width sw to the first maximum width w1 of the first parallelogram shape or to the second maximum width w2 of the second parallelogram shape is in a range of 1:1.9 to 1:2.2, e.g., 1:2.0 or 1:2.1.

In some embodiments, referring to FIG. 1B. FIG. 1D, and FIG. 1F, along the second direction, a ratio of the maximum slot length to a first maximum length of the first parallelogram shape or a second maximum length of the second parallelogram shape is in a range of 1:2.5 to 1:6.5. e.g., 1:2.5 to 1:3.0, 1:3.0 to 1:3.5, 1:3.5 to 1:4.0, 1:4.0 to 1:4.5, 1:4.5 to 1:5.0, 1:5.0 to 1:5.5, 1:5.5 to 1:6.0, 1:6.0 to 1:6.5. Optionally, the ratio of the maximum slot length to the first maximum length of the first parallelogram shape or the second maximum length of the second parallelogram shape is in a range of 1:3.5 to 1:4.5, e.g., 1:4.0 or 1:4.1.

Referring to FIG. 1F, is some embodiments, the impedance transformation line TL has a pseudo-rectangular shape. Specifically, in one example, the impedance transformation line TL includes a first side S1 connected to the microstrip feed line FL, a second side S2 connected to the first radiating patch RP1, and a third side S2 and a fourth side S4 between the first side S1 and the second side S2. The impedance transformation line TL father includes curved sides (e.g. CS1, CS2, CS3, and CS4). The third side S3 and the first side S1, the third side S3 and the second side S2, the fourth side S4 and the first side S1, the fourth side S4 and the second side S2, are connected by curved sides. In one example, a first curved side CS1 connects the second side S2 to the third side S3; a second curved side CS2 connects the second side S2 to the fourth side S4; a third curved side CS3 connects the third side S3 to the first side S1; and a fourth curved side CS3 connects the fourth side S4 to the first side S1.

Figure 3:
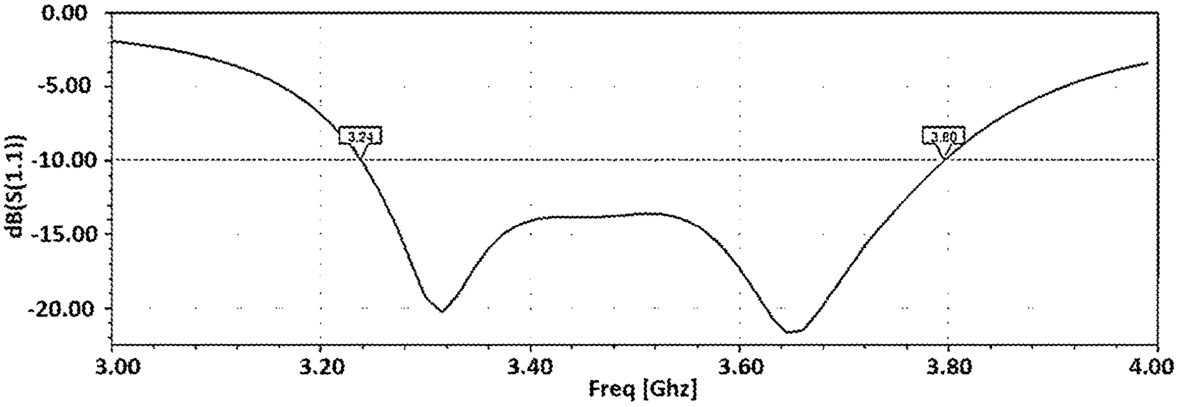
FIG. 3 illustrates an S11 graph of the antenna depicted in FIG. 1A.
Figure 4:
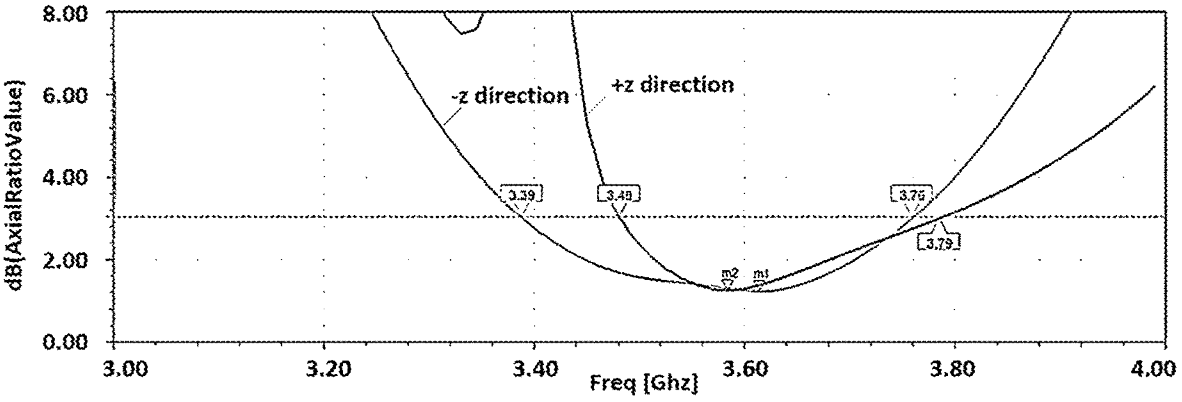
FIG. 4 illustrates an axial ratio graph of the antenna depicted in FIG. 1A.
Figure 5:
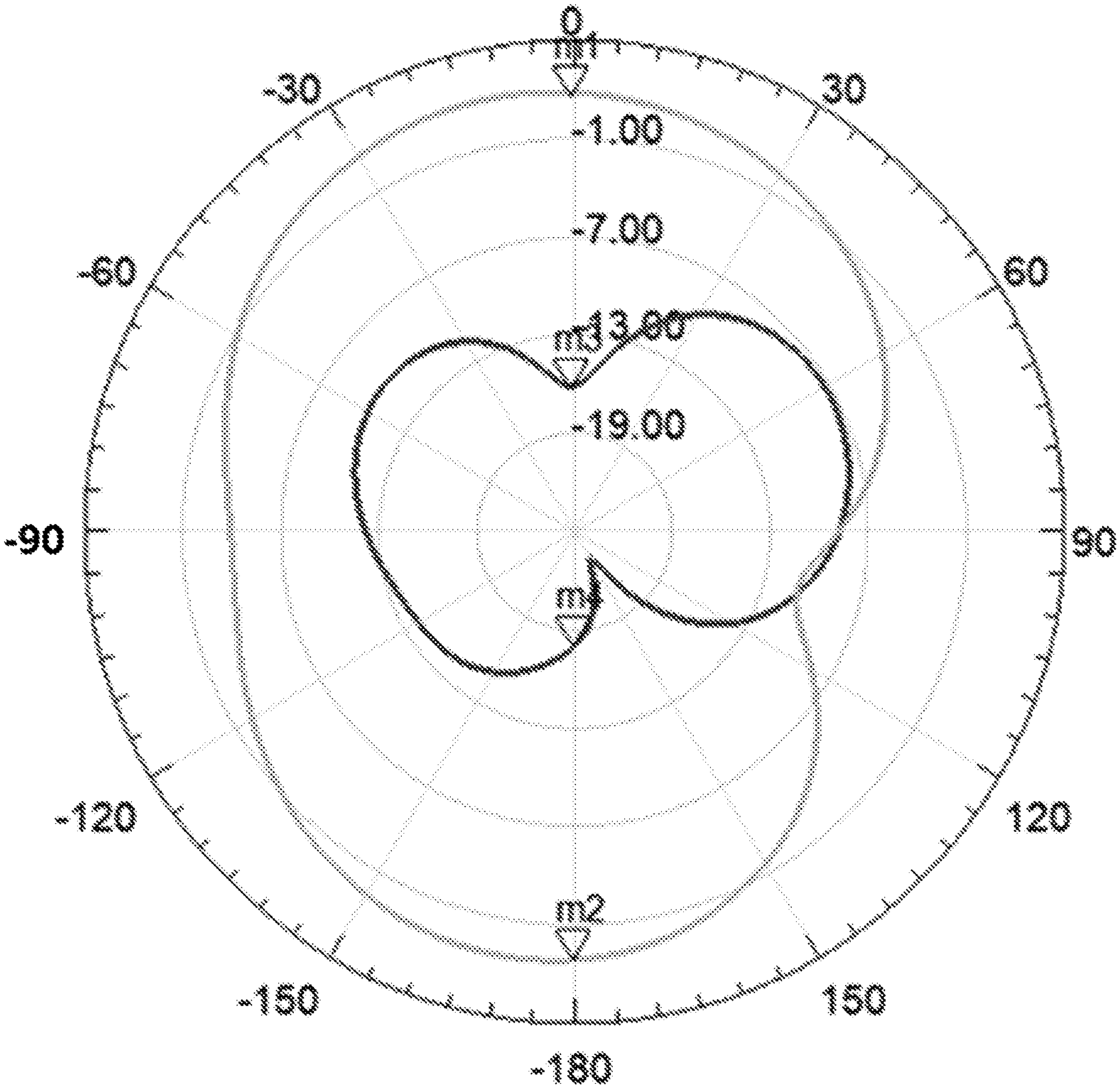
FIG. 5 illustrates an antenna radiation pattern of the antenna depicted in FIG. 1A in a XOZ plane at 3.6 GHz.
Figure 6:
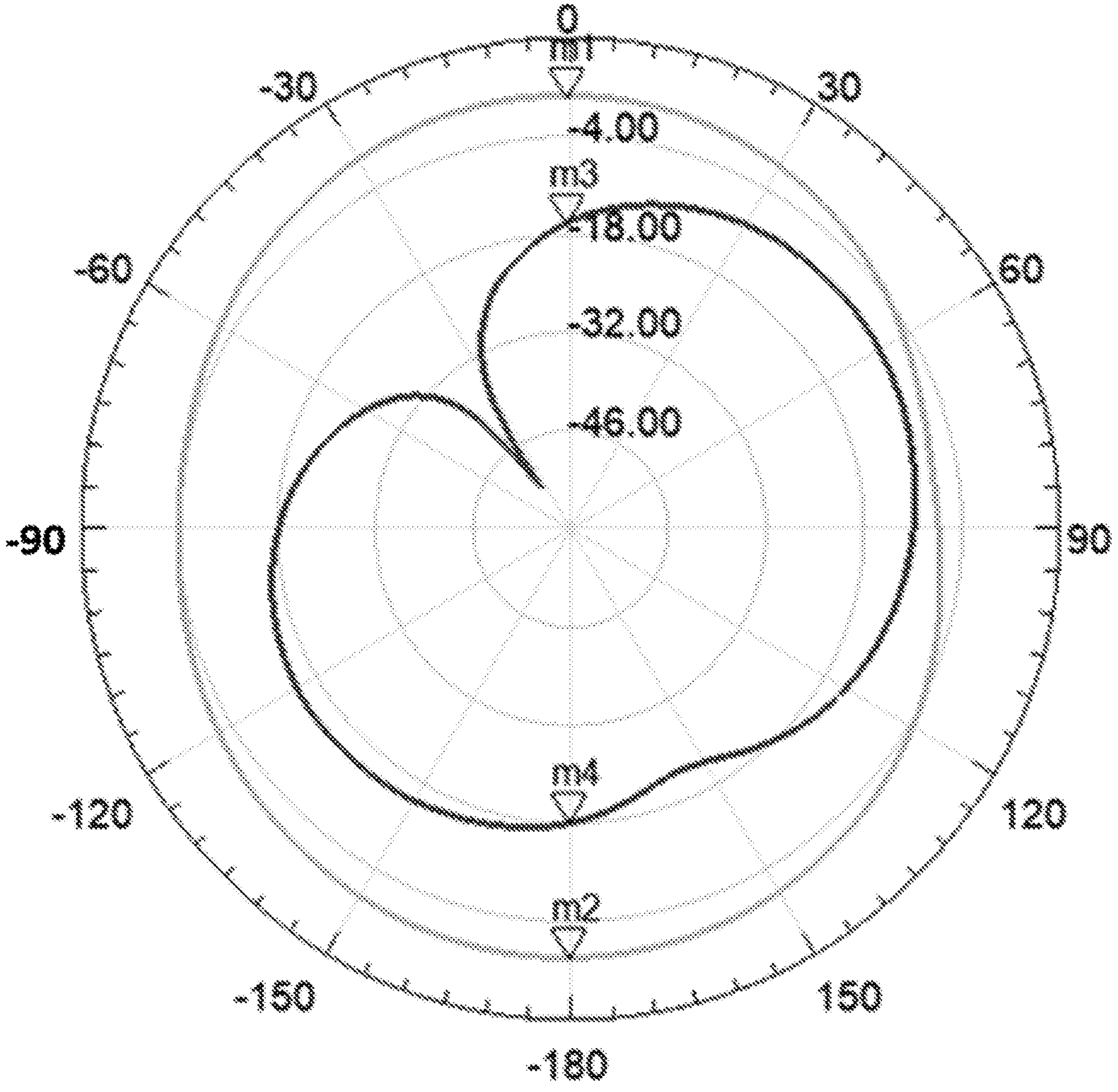
FIG. 6 illustrates as antenna radiation pattern of the antenna depicted in FIG. 1A in a YOZ plane at 3.6 GHz.
Figure 7:
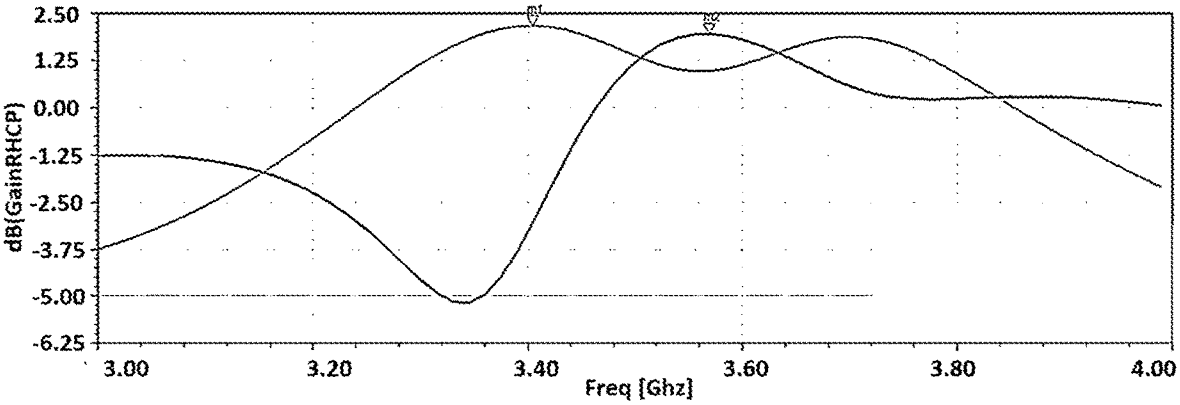
FIG. 7 illustrates a right-handed polarization gain curve of the antenna depicted in FIG. 1A.

FIG. 3 illustrates an S11 graph of the antenna depicted in FIG. 1A. FIG. 4 illustrates an axial ratio graph of the antenna depicted in FIG. 1A. FIG. 5 illustrates an antenna radiation pattern of the antenna depicted in FIG. 1A in a XOZ place at 3.6 GHz. FIG. 6 illustrates an antenna radiation pattern of the antenna depicted in FIG. 1A in a YOZ plane as 3.6 GHz. FIG. 7 illustrates a right-handed polarization gain curve of the antenna depicted in FIG. 1A. In one specific example, the antenna bus an overall thickness of $0.07\lambda_0$, wherein$\lambda_0$ stands for a wavelength in vacuum of a radiation produced by the antenna. The ground plate, the first radiation patch, the second radiation patch are made of a metallic material such as copper. The fest dielectric layer and the second dielectric layer have a dielectric constant of 2.5, a dissipation factor of 0.001, and a thickness of 3 mm. The first radiating patch and the second radiating patch have a thickness of 18 μm. The radiation generated by the antenna has a central frequency point f0 of 3.5 GHz. The first radiating patch has a dimension of 18.5 mm×18.5 mm. The second radiating patch has a dimension of 18.0 mm×18.0 mm. The respective first truncated side of the first radiating patch has a length of 4.67 mm. The respective second truncated side of the second radiating patch has a length of 5.80 mm. The first dielectric layer, the second dielectric layer, and the ground plate have a dimension of 45.0 mm×45.0 mm. The slot has dimension of 4.0 mm×9.0 mm. The microstrip feed line has a dimension of 3.25 mm×5.8 mm. The impedance transformation line has a dimension of 3.0 mm×10.0 mm. The curved sides of the impedance transformation line has a radius of curvature of 1.0 mms. FIG. 3 to FIG. 7 show data obtained in an antenna having the above parameters.

Referring to FIG. 3, the antenna has a −10 dB impedance bandwidth of 560 MHz (ranging from 3.24 GHz to 3.80 GHz). The S11 graph shows two line-polarized resonant peaks, which are excited due to the notches in the radiating patches. FIG. 4 shows axial ratio curves for the +z direction and the −z direction. The axial ratio band width at 3 dB for the +z direction is 310 MHz (ranging from 3.48 GHz to 3.79 GHz). The axial ratio band width at 3 dB for the −z direction is 370 MHZ (ranging from 3.39 GHZ to 3.76 GHZ). As shown in FIG. 4, the axial ratio curves for the +z direction and the −z direction do not completely overlap with each other, due to the differences is sizes of the patches and sizes of the notches in the radiating patches. The best circular polarization is achieved at 3.6 GHz. FIG. 5 shows the antenna left-handed polarized radiation pattern at a frequency point of 3.6 GHz. FIG. 6 shows the antenna right-handed polarized radiation pattern at a frequency point of 3.6 GHz. As shown in FIG. 5 and FIG. 6, the antenna is a right-handed circularly polarized antenna with bidirectional radiation. Referring to FIG. 7, the peak values of right-handed polarization gains are 1.9 dBi (+z direction) and 2.2 dBi (−z direction), respectively. The 3 dB axial ratio bandwidth of the antenna partially covers the n78 band, with a very low overall cross-polarization.

Figure 8A:
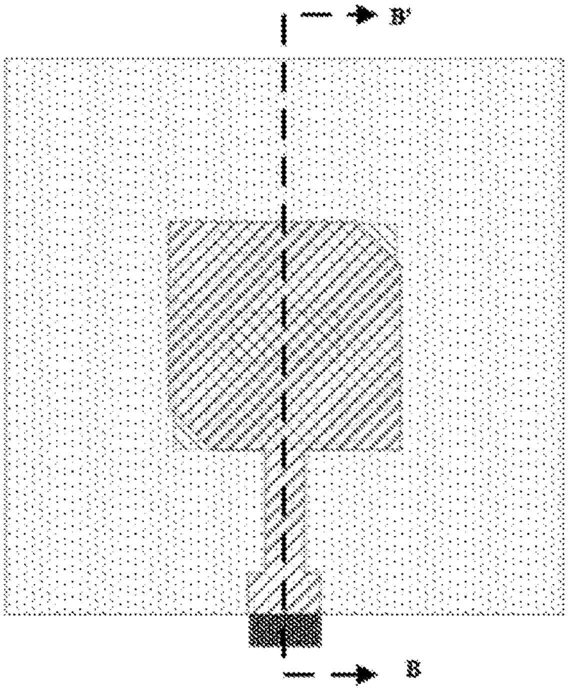
FIG. 8A is a plan view of an antenna in some embodiments according to the present disclosure.
Figure 8B:
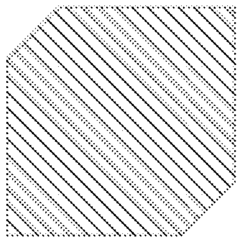
FIG. 8B illustrates the couture of a second radiating patch in an antenna depicted in FIG. 8A.
Figure 8C:
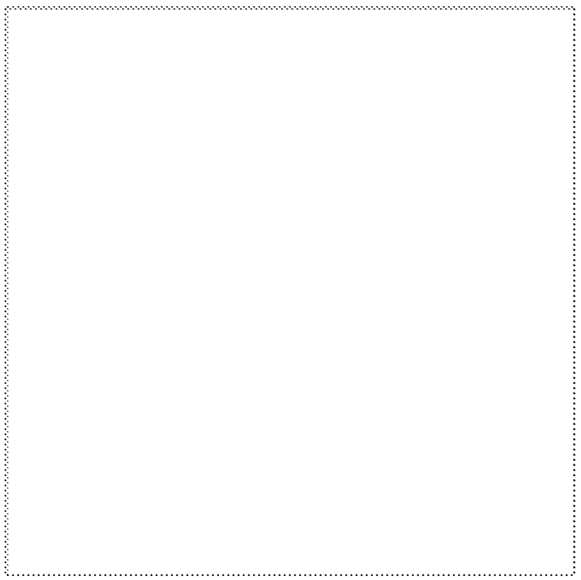
FIG. 8C illustrates the structure of a second dielectric layer in an antenna depicted in FIG. 8A.
Figure 8D:
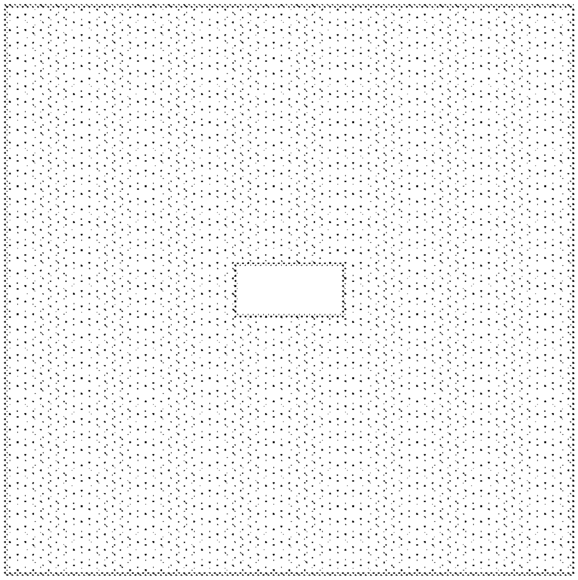
FIG. 8D illustrates the structure of a ground plate is an antenna depicted in FIG. 8A.
Figure 8E:
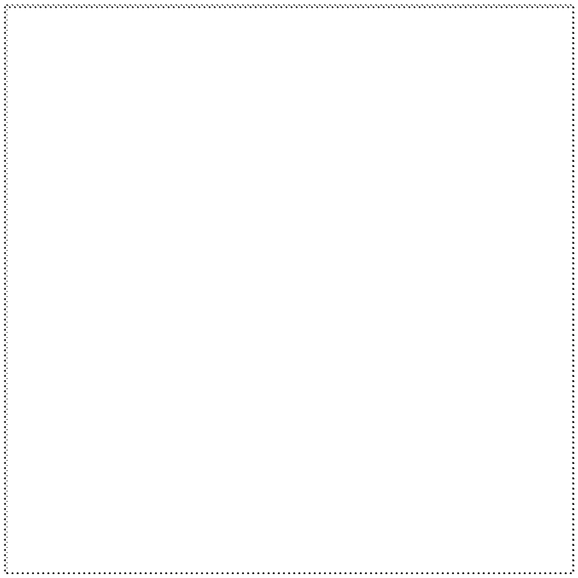
FIG. 8E illustrates the structure of a first dielectric layer is as antenna depicted is FIG. 8A.
Figure 8F:
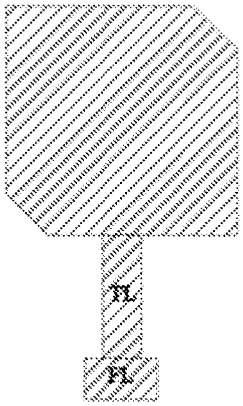
FIG. 8F illustrates the structure of a microstrip feed line and a first radiating patch in an antenna depicted in FIG. 8A.

FIG. 8A is a plan view of aw antenna in some embodiments according to the present disclosure. FIG. 8B illustrates the structure of a second radiating patch is an antenna depicted in FIG. 8A. FIG. 8C illustrates the structure of a second dielectric layer in an antenna depicted in FIG. 8A. FIG. 8D illustrates the structure of a ground plate is an antenna depicted in FIG. 8A. FIG. 8E illustrates the structure of a first dielectric layer in an antenna depicted in FIG. 8A. FIG. 8F illustrates the structure of a microstrip feed line and a first radiating patch in an antenna depicted in FIG. 8A. The antenna depicted in FIG. 8A to FIG. 8F differs from the antenna depicted in FIG. 1A to FIG. 1F is that the impedance transformation line TL in FIG. 8A to FIG. 8F does not have curved sides. In the antenna depicted in FIG. 8A to FIG. 8F, the impedance transformation line TL has a rectangular shape.

Figure 9:
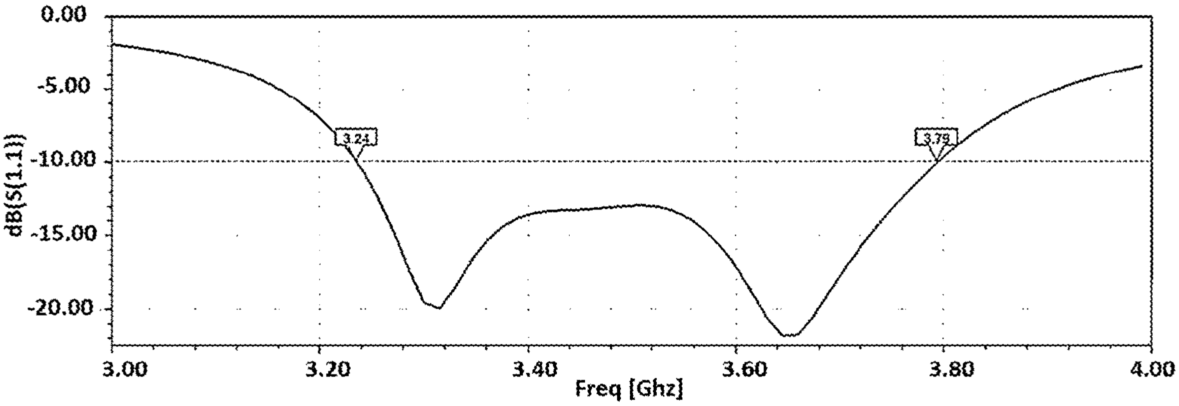
FIG. 9 illustrates an S11 graph of the antenna depicted in FIG. 8A.
Figure 10:
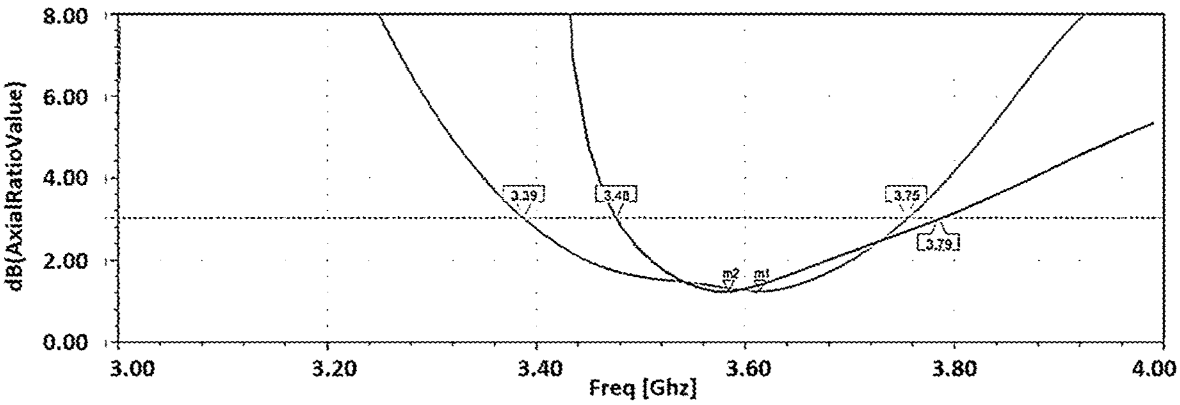
FIG. 10 illustrates an axial ratio graph of the antenna depicted in FIG. 8A.
Figure 11:
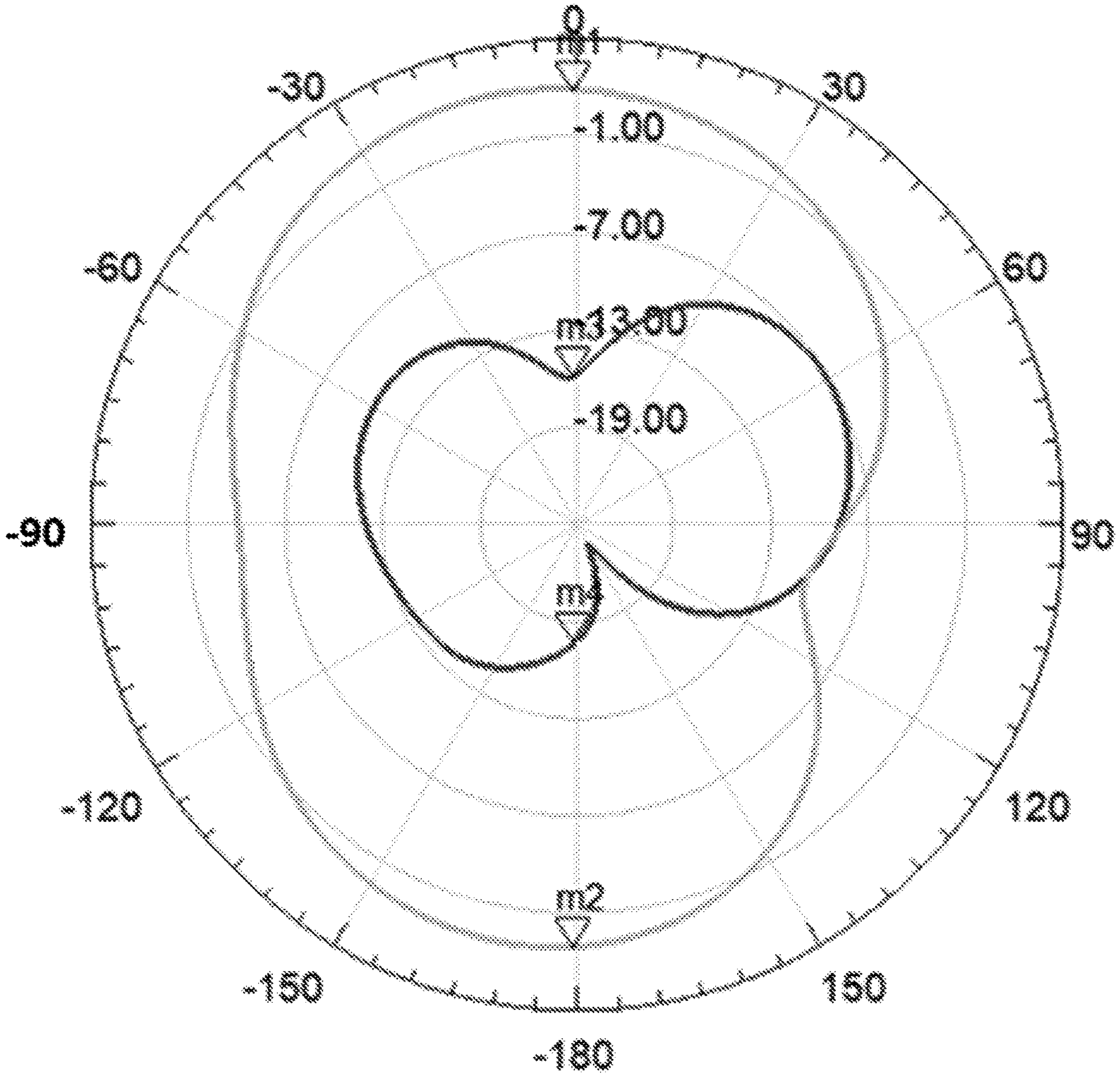
FIG. 11 illustrates an antenna radiation pattern of the antenna depicted in FIG. 8A in a XOZ plane at 3.6 GHz.
Figure 12:
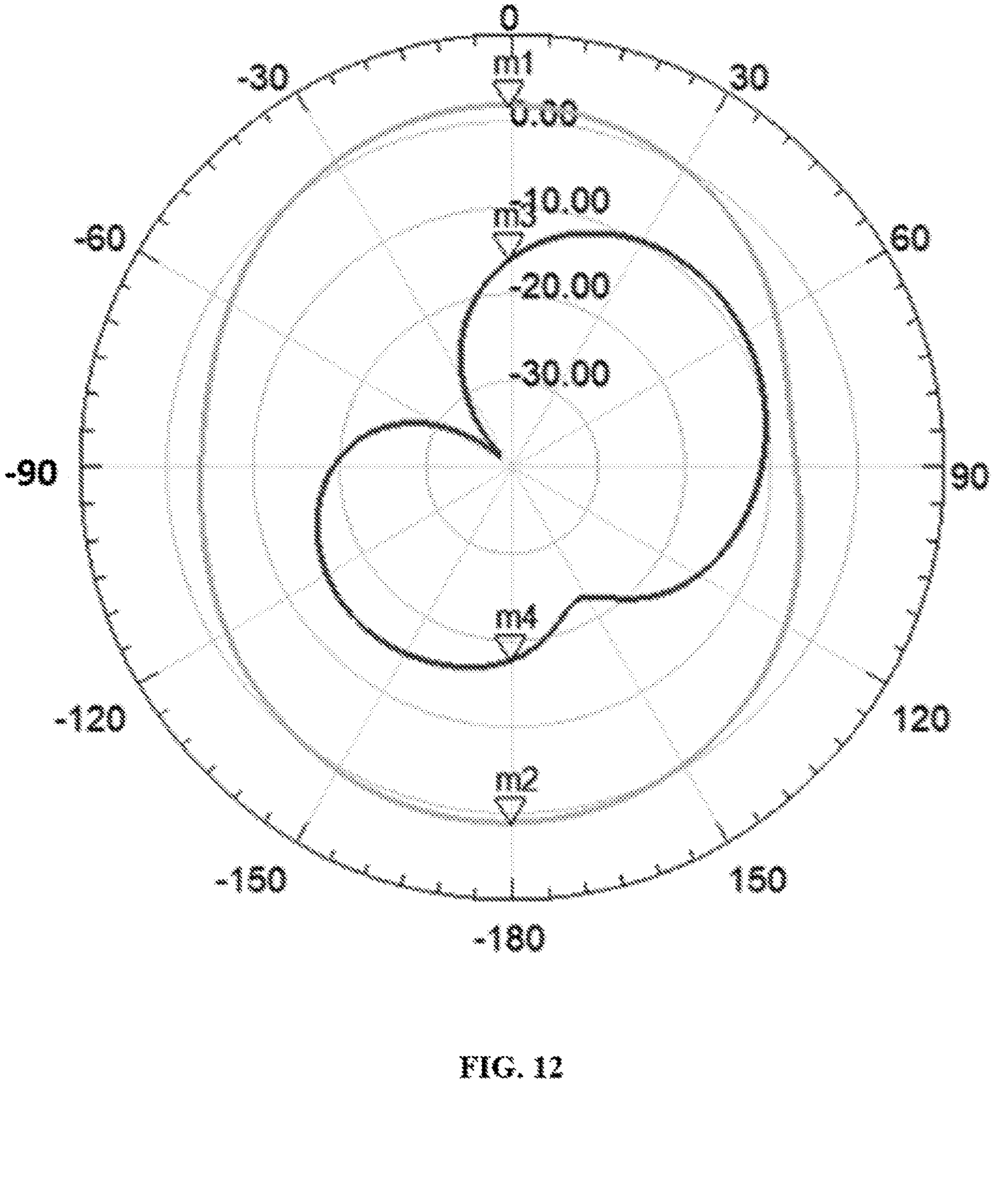
FIG. 12 illustrates an antenna radiation pattern of the antenna depicted in FIG. 8A in a YOZ plane at 3.6 GHz.
Figure 13:
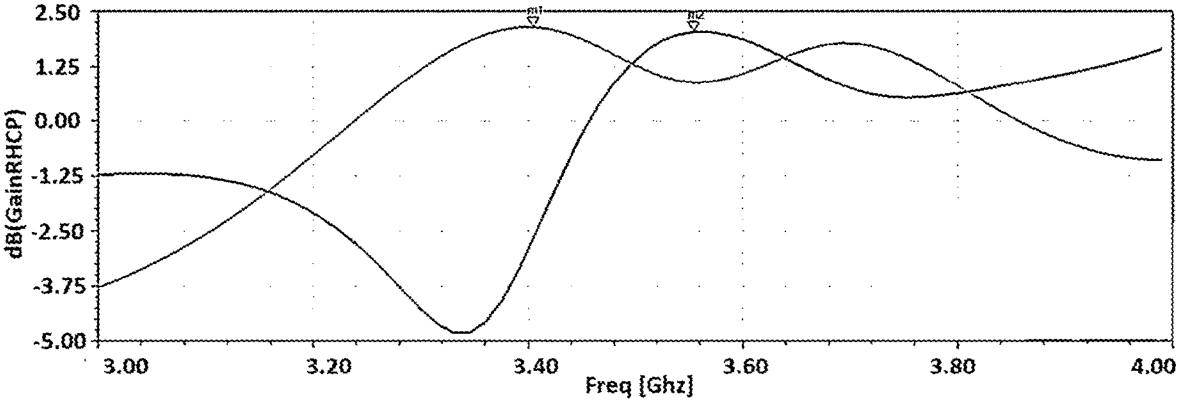
FIG. 13 illustrates a right-handed polarization gain curve of the antenna depicted in FIG. 8A.

FIG. 9 illustrates an S11 graph of the antenna depicted in FIG. BA. FIG. 10 illustrates a axial ratio graph of the antenna depicted in FIG. 8A. FIG. 11 illustrates aw antenna radiation pattern of the antenna depicted in FIG. 8A in a XOZ plane at 3.6 GHz. FIG. 12 illustrates an antenna radiation pattern of the antenna depicted in FIG. BA in a YOZ plane at 3.6 GHz. FIG. 13 illustrates a right-handed polarisation gain curve of the antenna depicted in FIG. 8A. In one specific example, the antenna has an overall thickness of $0.07\lambda_0$, wherein$\lambda_0$ stands for a wavelength in vacuums of a radiation produced by the antenna. The ground plate, the first radiation patch, the second radiation patch are made of a metallic material such as copper. The first dielectric layer and the second dielectric layer have a dielectric constant of 2.5, a dissipation factor of 0.001, and a thickness of 3 mm. The first radiating patch and the second radiating patch have a thickness of 18 μm. The radiation generated by de antenna has a central frequency point f0 of 3.5 GHz. The first radiating watch has a dimension of 18.5 mm×18.5 mm. The second radiating patch has a dimension of 18.0 mm×18.0 mm. The respective first truncated side of the first radiating patch has a length of 4.67 mm. The respective second truncated side of the second radiating patch has a length of 5.80 mm. The first dielectric layer, the second dielectric layer, and the ground plate have a dimension of 45.0 mm×45.0 mm. The slot has dimensions of 4.0 mm×9.0 mm. The microstrip feed line has a dimension of 3.25 mm×5.8 mm. The impedance transformation line has a dimension of 3.0 mm×10.0 mm. FIG. 9 to FIG. 13 show data obtained is an antenna having the above parameters.

Referring to FIG. 9, the antenna has a −10 dB impedance bandwidth of 550 MHz (ranging from 3.24 GHz to 3.79 GHZ). The S11 graph shows two love-polarised resonant peaks, which are excited due to the notches in the radiating patches. FIG. 10 shows axial ratio curves for the +z direction and the −z direction. The axial ratio band width at 3 dB for the +z direction is 310 MHz (ranging from 3.48 GHz to 3.79 GHZ). The axial radio band width at 3 dB for the −z direction is 360 MHz (ranging from 3.39 GHz to 3.75 GHz). As shown in FIG. 10, the axial ratio curves for the +z direction and the −z direction do not completely overlay with each other, due to the differences in sizes of the patches and sizes of the notches in the radiating patches. The best circular polarisation is achieved at 3.6 GHz. FIG. 1*l* shows the antenna left-handed polarized radiation pattern at a frequency point of 3.6 GHZ, FIG. 12 shows the antenna right-handed polarised radiation pattern at a frequency point of 3.6 GHz. As shown in FIG. 11 and FIG. 12, the antenna is a right-handed circularly polarised antenna with bidirectional radiation. The overall cross-polarization is very low, e.g., less than −18 dBi. The asymmetry between the left-handed polarized radiation pattern and the right-handed polarized radiation pattern is due to the different feeding mechanisms. Referring to FIG. 13, the peak values of right-handed polarization gains are 2.0 dBi (+z direction) and 2.1 dBi (−z direction), respectively.

Comparing the antenna depicted in FIG. 8A to FIG. 8F with the antenna depicted in FIG. 1A to FIG. 1F, the presence or absence of the curved sides in the impedance transformation line TL does not affect the performance of the antenna. The 3 dB axial ratio bandwidth of the antenna partially covers the n78 band, and the overall cross-polarization is very low. However, the antenna having aw impedance transformation line TL with the carved sides can be fabricated with a lower defect rate.

Figure 14A:
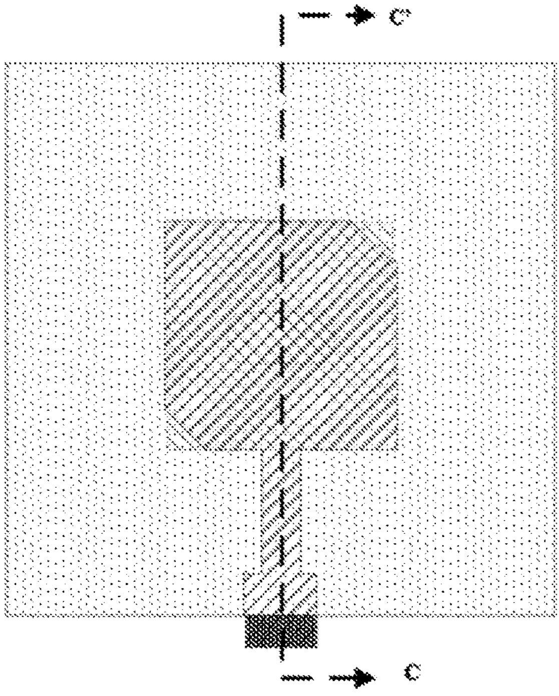
FIG. 14A is a plan view of an antenna in some embodiments according to the present disclosure.
Figure 14B:
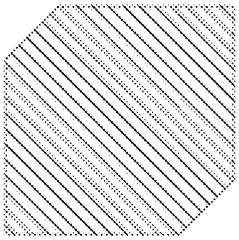
FIG. 14B illustrates the structure of a second radiating patch in an antenna depicted is FIG. 14A.
Figure 14C:
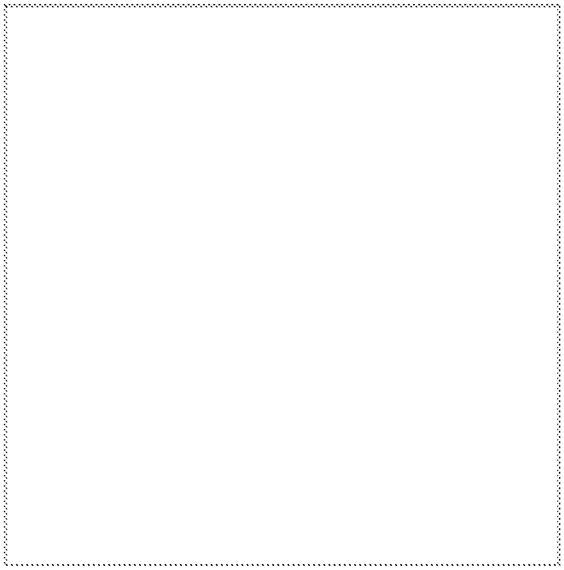
FIG. 14C illustrates the structure of a second dielectric layer in ax antenna depicted in FIG. 14A.
Figure 14D:
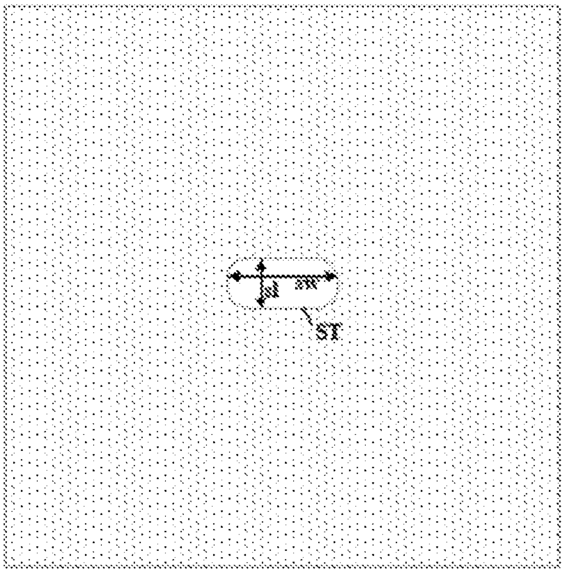
FIG. 14D illustrates the structure of a ground plate in an antenna depicted in FIG. 14A.
Figure 14E:
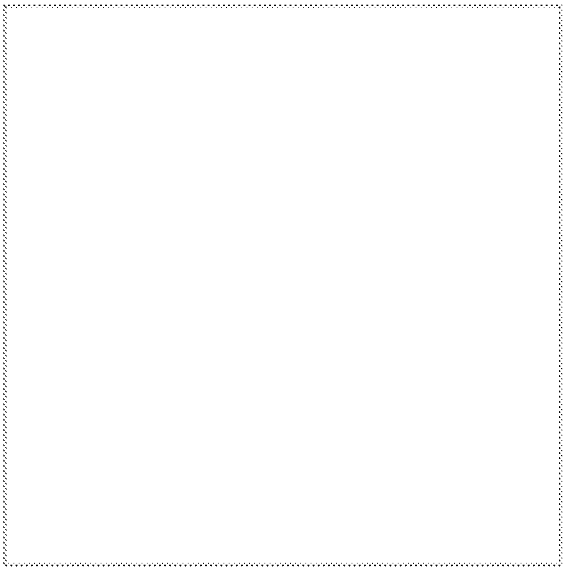
FIG. 14E illustrates the structure of a first dielectric layer in an antenna depicted in FIG. 14A.
Figure 14F:
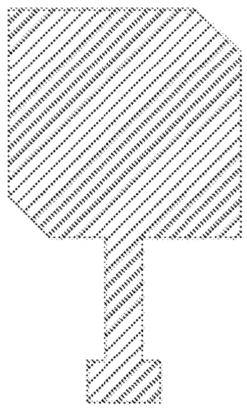
FIG. 14F illustrates the structure of a microstrip feed line and a first radiating patch in as antenna depicted in FIG. 14A.

FIG. 14A is a plan view of an antenna in some embodiments according to the present disclosure. FIG. 14B illustrates the structure of a second radiating patch in an antenna depicted in FIG. 14A. FIG. 14C illustrated the structure of a second dielectric layer in an antenna depicted in FIG. 14A. FIG. 14D illustrates the structure of a ground plate in an antenna depicted in FIG. 14A. FIG. 14E illustrates the structure of a first dielectric layer in an antenna depicted in FIG. 14A. FIG. 14F illustrates the structure of a microstrip feed line and a first radiating patch is an antenna depicted w FIG. 14A. The antenna depicted in FIG. 14A to FIG. 14F differs from the antenna depicted in FIG. 8A to FIG. 8F in shapes and sizes of the slot ST. In the antenna depicted in FIG. 8A to FIG. 8F, the slot ST has a rectangular shape. In the antenna depicted in FIG. 14A to FIG. 14F, the slot ST has a rectangular shape with round corners. The maximum slot width sw and the maximum slot length al of the slots is the antenna depicted in FIG. 14A to FIG. 14F and in the antenna depicted in FIG. 8A to FIG. 8F are the same.

Figure 15:
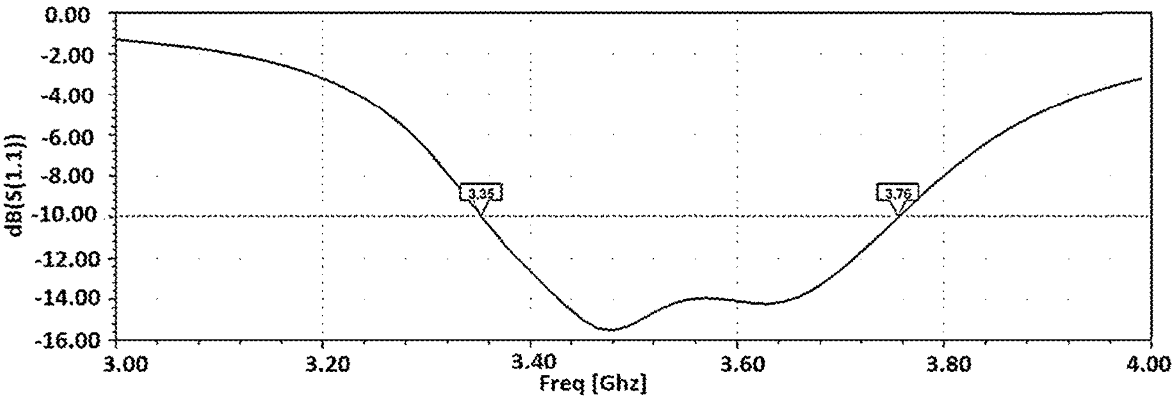
FIG. 15 illustrates an S11 graph of the antenna depicted in FIG. 14A.
Figure 16:
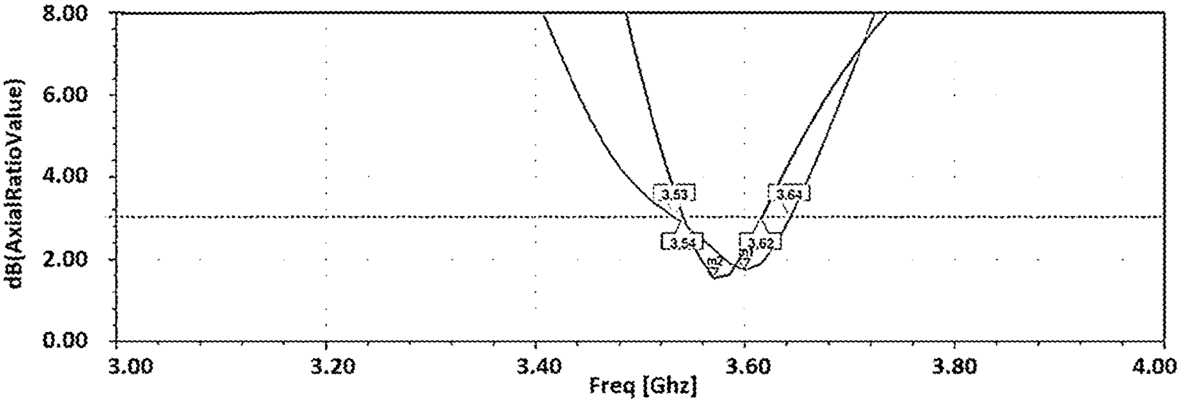
FIG. 16 illustrates an axial ratio graph of the antenna depicted in FIG. 14A.
Figure 17:
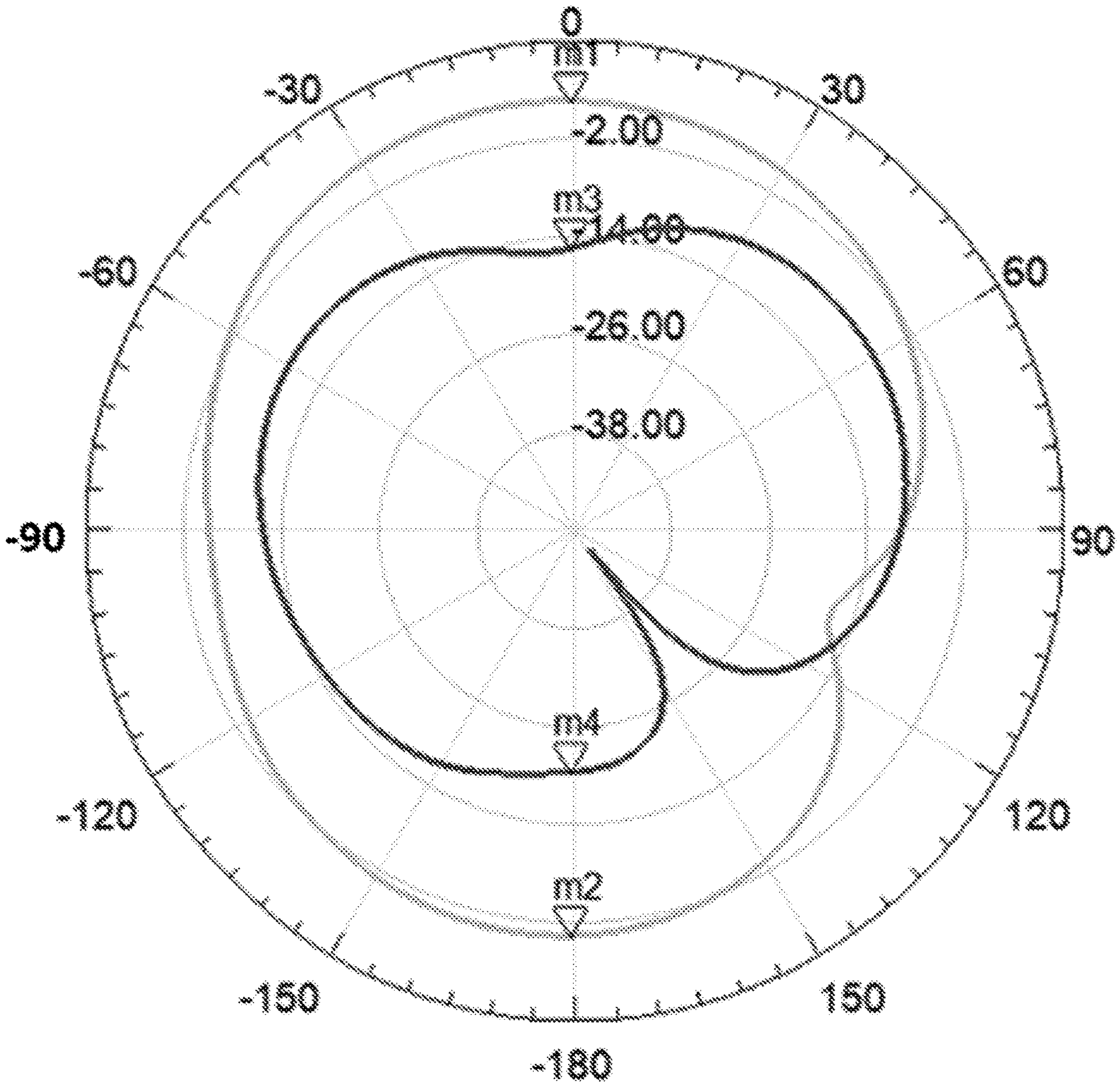
FIG. 17 illustrates an antenna radiation pattern of the antenna depicted in FIG. 14A is a XOZ plane at 3.6 GHz.
Figure 18:
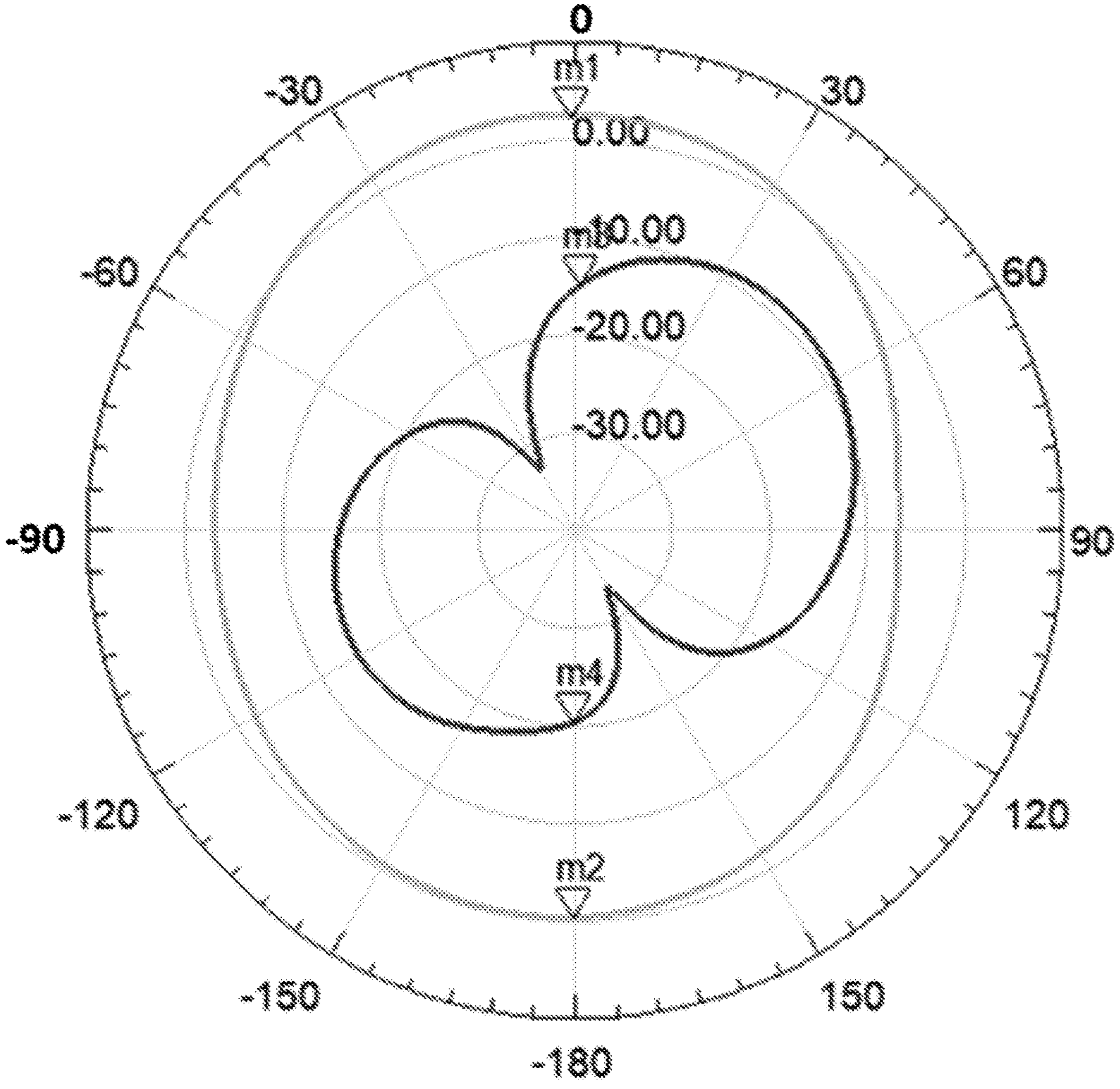
FIG. 18 illustrates an antenna radiation pattern of the antenna depicted in FIG. 14A in a YOZ plane at 3.6 GHz.
Figure 19:
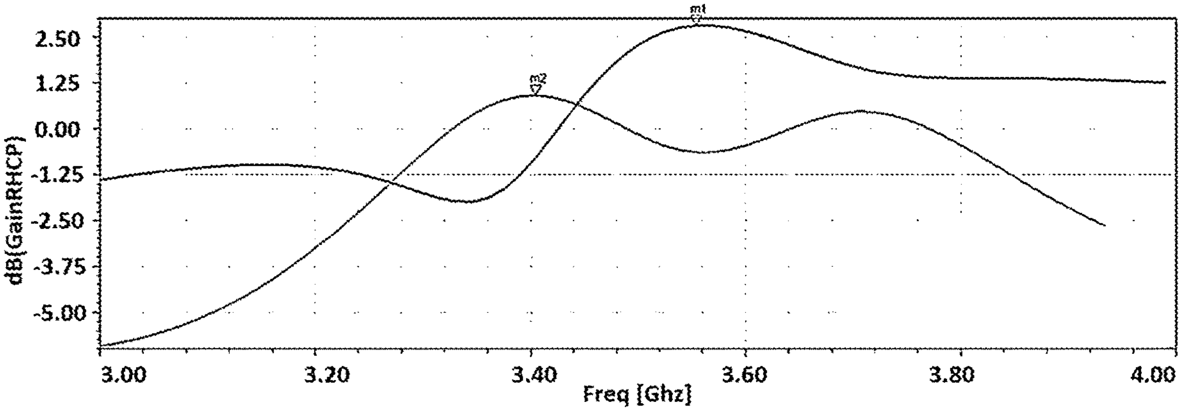
FIG. 19 illustrates a right-handed polarization gain curve of the antenna depicted in FIG. 14A.

FIG. 15 illustrates an S11 graph of the antenna depicted in FIG. 14A. FIG. 16 illustrates as axial ratio graph of the antenna depicted in FIG. 14A. FIG. 17 illustrates an antenna radiation pattern of the antenna depicted in FIG. 14A in a XOZ plane at 3.6 GHz. FIG. 18 illustrates an antenna radiation pattern of the antenna depicted in FIG. 14A is a YOZ place at 3.6 GHZ. FIG. 19 illustrates s right-handed polarization gain curve of the antenna depicted in FIG. 14A. Is one specific example, the antenna has an overall thickness of $0.07\lambda_0$, wherein $\lambda_0$ stands for a wavelength in vacuum of a radiation produced by the antenna. The ground plate, the first radiation patch, the second radiation patch are made of a metallic material such as copper. The first dielectric layer and the second dielectric layer have a dielectric constant of 2.5, a dissipation factor of 0.001, and a thickness of 3 mm. The first radiating patch and the second radiating patch have a thickness of 18 μm. The radiation generated by the antenna has a central frequency point f0 of 3.5 GHz. The first radiating patch has a dimension of 18.5 mm×18.5 mm. The second radiating patch has a dimension of 18.0 mm×18.0 mm. The respective first truncated side of the first radiating patch has a length of 4.67 mm. The respective second truncated side of the second radiating patch has a length of 5.80 mm. The fest dielectric layer, the second dielectric layer, and the ground plate have a dimension of 45.0 mm×45.0 mm. The slot has dimension of 4.0 mm×9.0 mum, and has a shape of rectangle with rowed corners. The round corners have a radius of curvature of 2.00 mm. The microstrip feed line has a dimension of 3.25 mm×5.8 mm. The impedance transformation line has a dimension of 3.0 mm×10.0 mm. FIG. 15 to FIG. 19 show data obtained in as antenna having the above parameters.

Referring to FIG. 15, the antenna has a −10 dB impedance bandwidth of 410 MHz (ranging from 3.35 GHz to 3.76 GHz). The S11 graph shows two line-polarized resonant peaks, which are excited due to the notches in the radiating patches. FIG. 16 shows axial ratio curves for the +z direction and the −z direction. The axial ratio band width at 3 dB for the +z direction is 80 MHz (ranging from 3.54 GHz to 3.62 GHz). The axial ratio band width at 3 dB for the −z direction is 110 MHz (ranging from 3.53 GHZ to 3.64 GHz). As shown in FIG. 16, the axial ratio curves for the +z direction and the −z direction do not completely overlay with each other, due to the differences in sizes of the patches and sizes of the notches in the radiating patches. The best circular polarization is achieved at 3.6 GHz. FIG. 17 shows the antenna left-handed polarized radiation pattern at a frequency point of 3.6 GHz, FIG. 18 shows the antenna right-handed polarized radiation pattern at a frequency point of 3.6 GHZ. As shown is FIG. 17 and FIG. 18, the antenna is a right-handed circularly polarized antenna with bidirectional radiation. The overall cross-polarization is very low, e.g., less than −17 dBi. The asymmetry between the left-handed polarized radiation pattern and the right-handed polarized radiation pattern is due to the different feeding mechanisms. Referring to FIG. 19, the peak values of right-handed polarization gains are 2.8 dBi (+z direction) and 0.9 dBi (−z direction), respectively.

The antenna depicted in FIG. 14A to FIG. 14F has a much smaller axial ratio bawd width at 3 dB, as compared to the antenna depicted in FIG. 8A to FIG. 8F. This is due to the decreased size of the slot. A slot with a decreased size weakens the aperture coupling, leading to mismatched polarization between the forward radiation and the backward radiation. Nonetheless, the 3 dB axial ratio bandwidth of the antenna depicted in FIG. 14A to FIG. 14F still partially covers the n78 band, and the overall cross-polarization is very low.

Figure 20A:
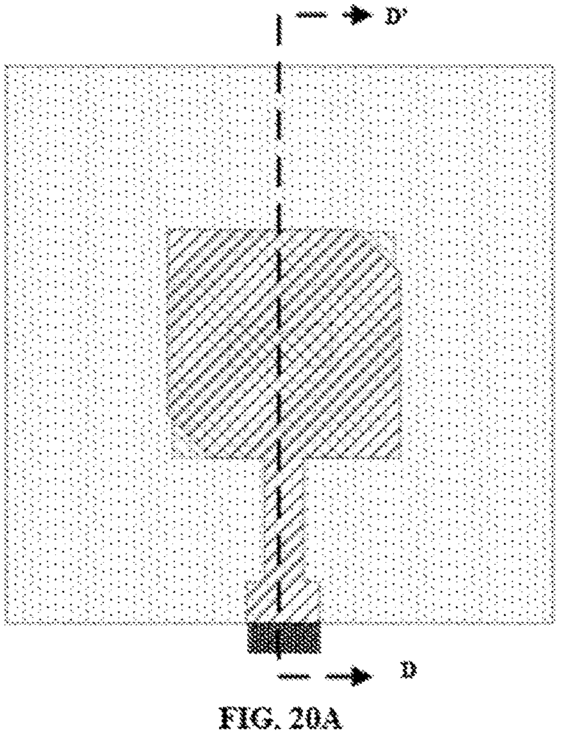
FIG. 20A is a plan view of an antenna in some embodiments according to the present disclosure.
Figure 20B:
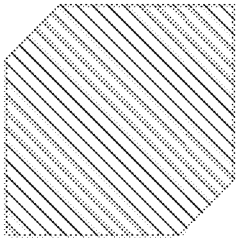
FIG. 20B illustrates the structure of a second radiating patch in an antenna depicted in FIG. 20A.
Figure 20C:
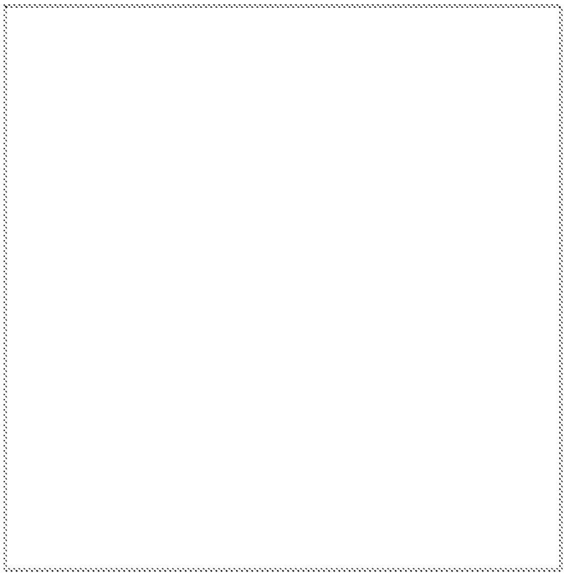
FIG. 20C illustrates the structure of a second dielectric layer in an antenna depicted in FIG. 20A.
Figure 20D:
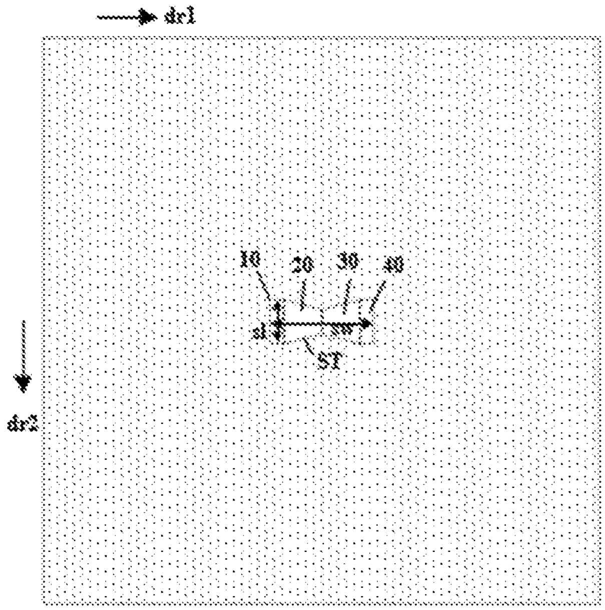
FIG. 20D illustrates the structure of a ground plate is an antenna depicted in FIG. 20A.
Figure 20E:
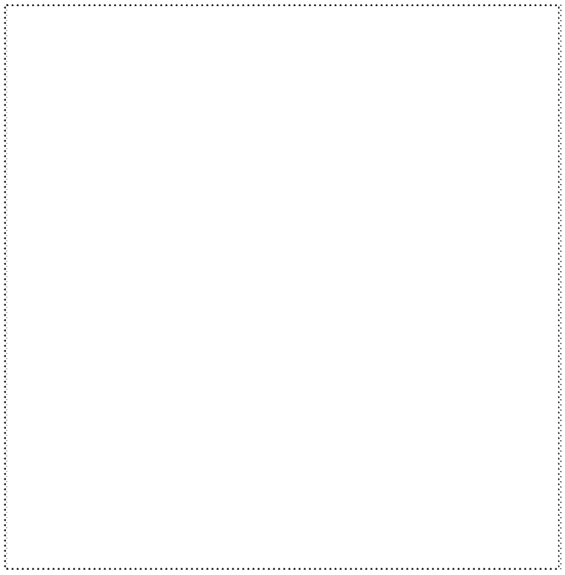
FIG. 20E illustrates the structure of a first dielectric layer in an antenna depicted in FIG. 20A.
Figure 20F:
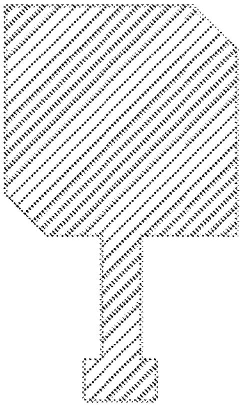
FIG. 20F illustrates the structure of a microstrip feed line and a first radiating patch in as antenna depicted in FIG. 20A.

FIG. 20A is a plan view of an antenna in some embodiments according to the present disclosure. FIG. 20B illustrates the structure of a second radiating patch in an antenna depicted in FIG. 20A. FIG. 20C illustrates the structure of a second dielectric layer in an antenna depicted in FIG. 20A. FIG. 20D illustrates the structure of a ground plate in an antenna depicted in FIG. 20A. FIG. 20E illustrates the structure of a first dielectric layer in an antenna depicted in FIG. 20A. FIG. 20F illustrates the structure of a microstrip feed line and a first radiating patch is an antenna depicted in FIG. 20A. The antenna depicted in FIG. 20A to FIG. 20F differs from the antenna depicted in FIG. 8A to FIG. 8F in shapes and sizes of the slot ST. In the antenna depicted in FIG. 8A to FIG. 8F, the slot ST has a rectangular shape. In the antenna depicted in FIG. 20A to FIG. 20F, the slot ST has a shape comprising, sequentially along a first direction dr1, a first rectangular shape 10, a first trapezoidal shape 20, a second trapezoidal shape 30, and a second rectangular shape 40. Short sides of the first trapezoidal shape 20 and the second trapezoidal shape 30 are connected to each other. Along a second direction dr2 perpendicular to the first direction dr1, lengths of the first rectangular shape 10 and the second rectangular shape 40 are substantially the same as lengths of long sides of the first trapezoidal shape 20 and the second trapezoidal shape 30. The maximum slot width and the maximum slot length of the slots in de antenna depicted in FIG. 20A to FIG. 20F and in the antenna depicted in FIG. 8A to FIG. 8F are the same.

Figure 21:
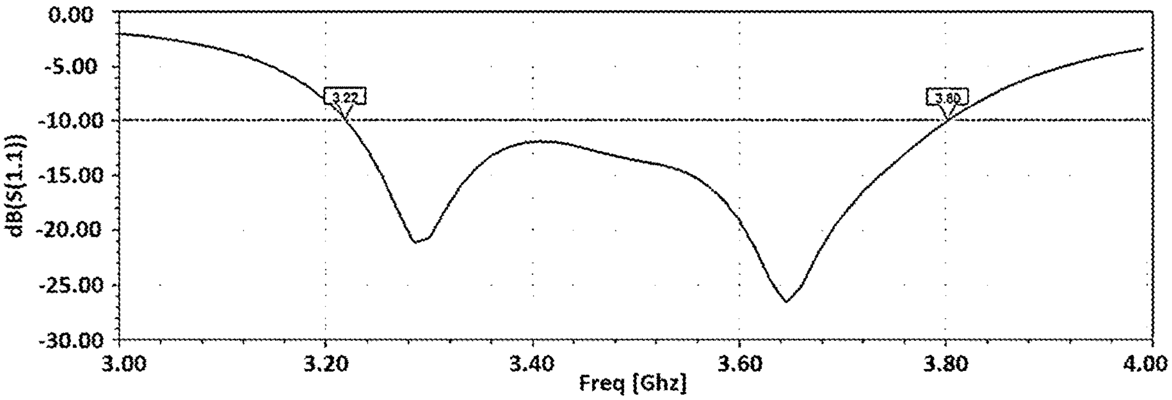
FIG. 21 illustrates an S11 graph of the antenna depicted in FIG. 20A.
Figure 22:
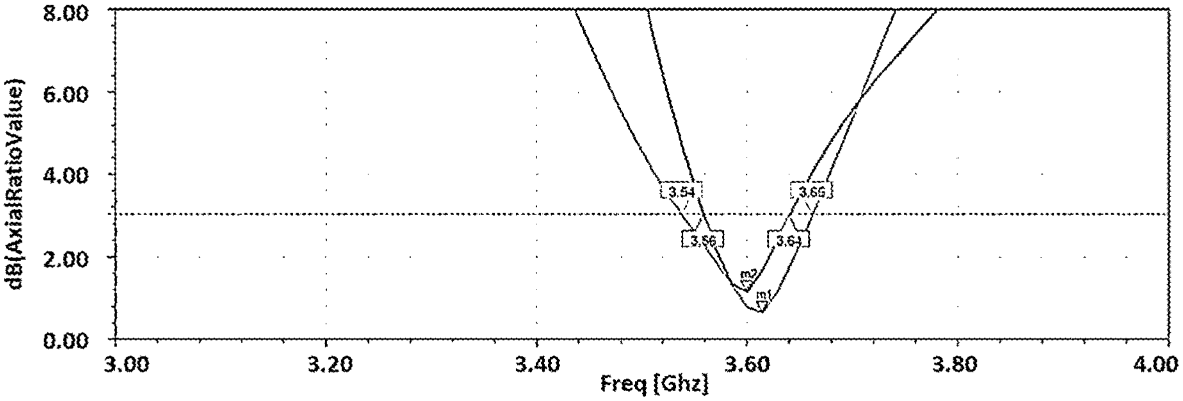
FIG. 22 illustrates an axial ratio graph of the antenna depicted in FIG. 20A.
Figure 23:
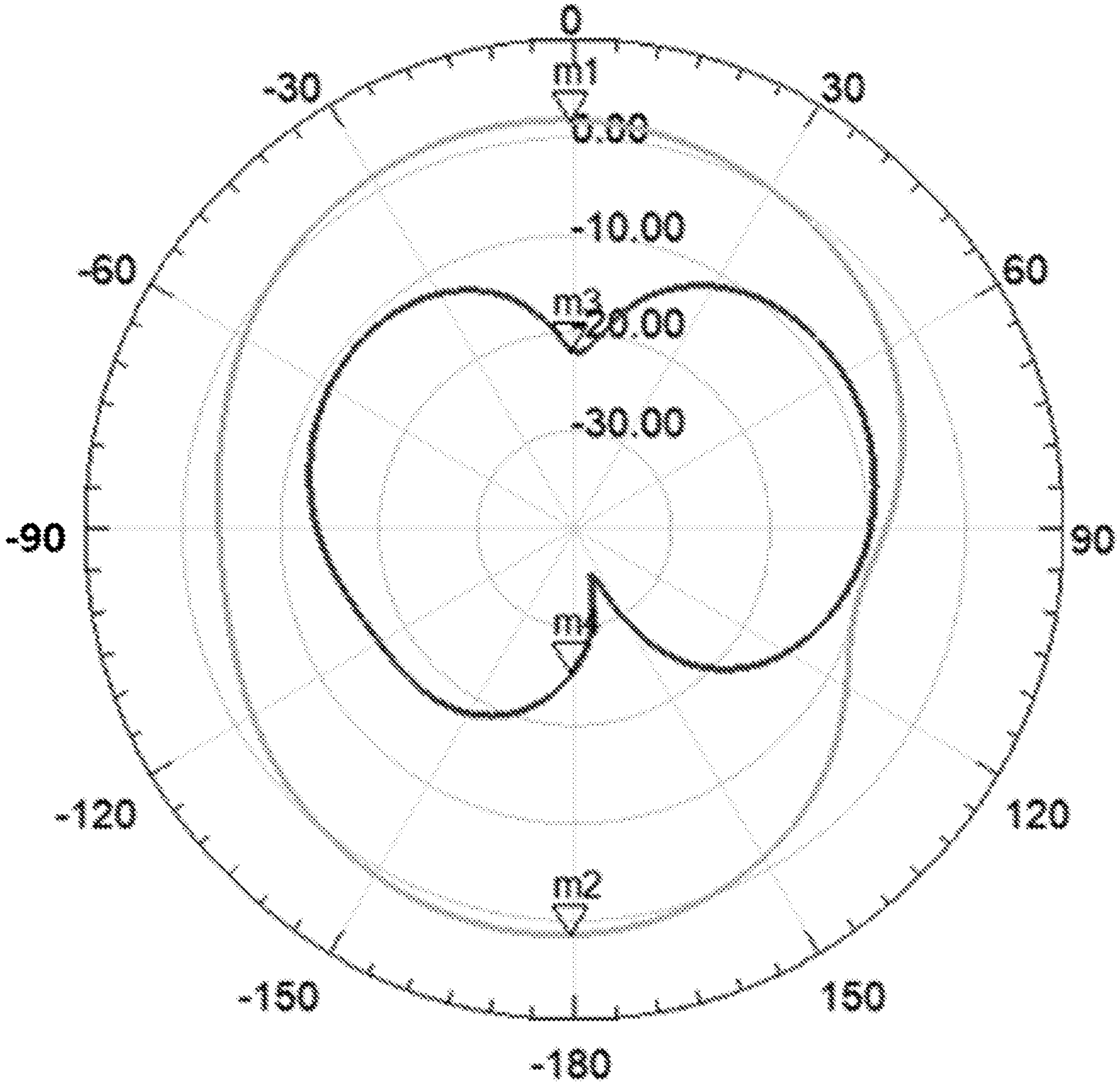
FIG. 23 illustrates an antenna radiation pattern of the antenna depicted in FIG. 20A w a XOZ plane at 3.6 GHz.
Figure 24:
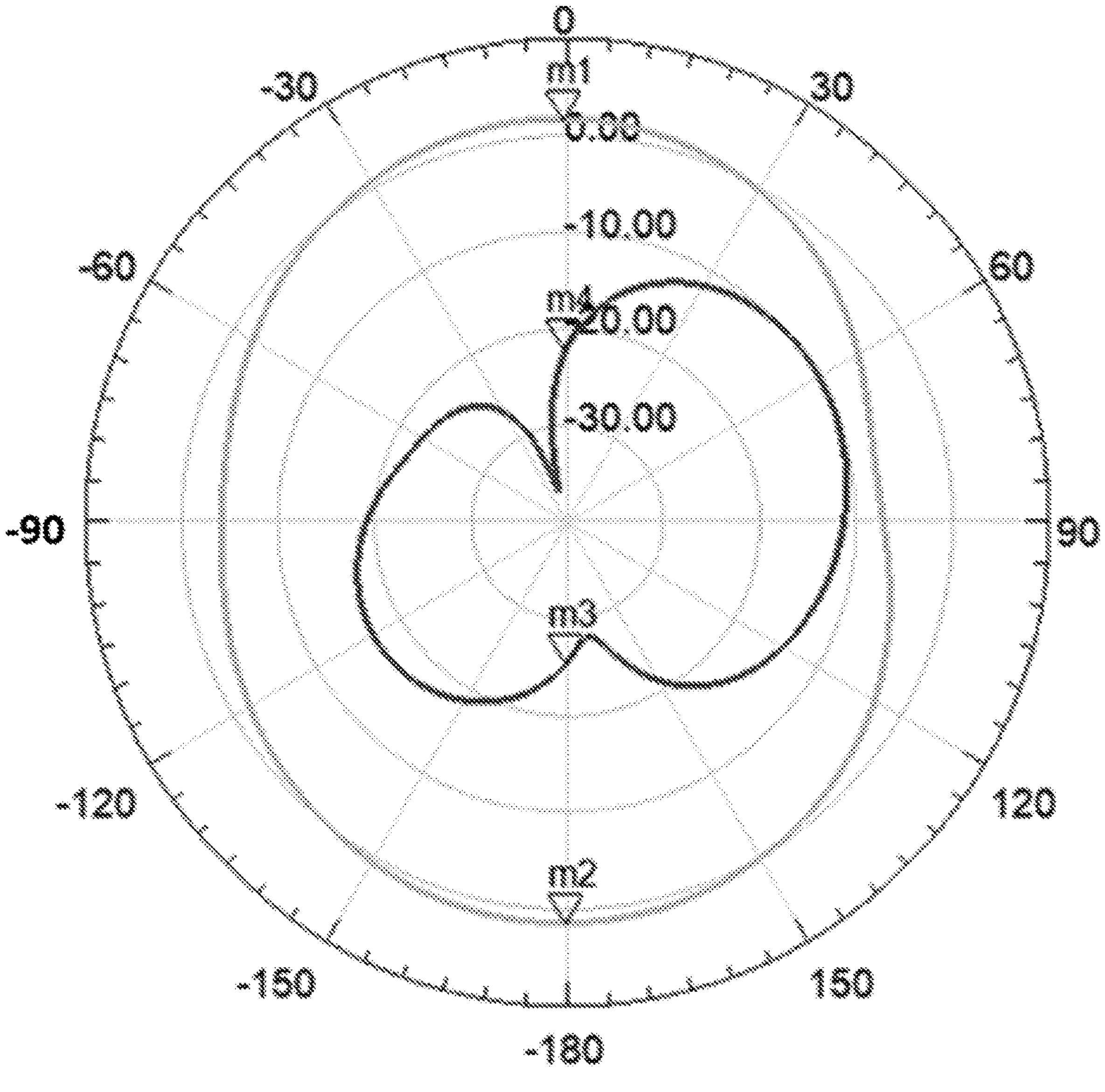
FIG. 24 illustrates an antenna radiation pattern of the antenna depicted in FIG. 20A in a YOZ plane at 3.6 GHz.
Figure 25:
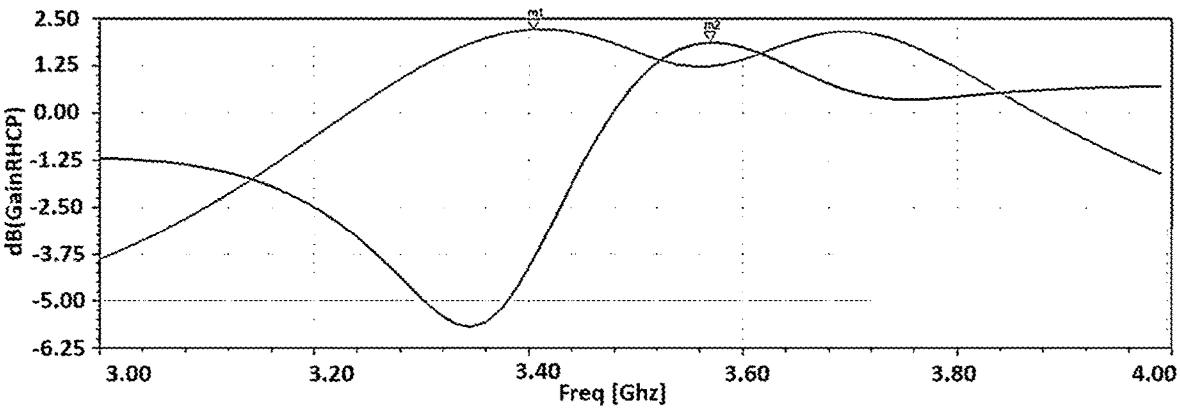

FIG. 21 illustrates an S11 graph of the antenna depicted in FIG. 20A. FIG. 22 illustrates aw axial ratio graph of the antenna depicted in FIG. 20A. FIG. 23 illustrates ax antenna radiation pattern of the antenna depicted in FIG. 20A in a XOZ plane at 3.6 GHz. FIG. 24 illustrates an antenna radiation pattern of the antenna depicted in FIG. 20A in a YOZ plane at 3.6 GHz. FIG. 25 illustrates a right-handed polarization gain curve of the antenna depicted in FIG. 20A. In one specific example, the antenna has an overall thickness of $0.07\lambda_0$, wherein $\lambda_0$ stands for a wavelengths in vacuum of a radiation produced by the antenna. The ground plate, the first radiation patch, the second radiation patch are made of a metallic material such as copper. The first dielectric layer and the second dialectic layer have a dielectric constant of 2.5, a dissipation factor of 0.001, and a thickness of 3 num. The first radiating patch and the second radiating patch have a thickness of 18 μm. The radiation generated by the antenna has a central frequency point f0 of 3.5 GHz. The first radiating patch has a dimension of 18.5 mm×18.5 mm. The second radiating patch has a dimension of 18.0 mm×18.0 mm. The respective first truncated side of the first radiating patch has a length of 4.67 mm. The respective second truncated side of the second radiating patch has a length of 5.80 mm. The Best dielectric layer, the second dielectric layer, and the ground plate have a dimension of 45.0 mm×45.0 mm. The slot has dimension of 4.0 mm×9.0 mm, and has a shape as described above. The microstrip feed line has a dimension of 3.25 mm×5.8 mm. The impedance transformation line has a dimension of 3.0 mm×10.0 mm. FIG. 21 to FIG. 25 show data obtained in an antenna having the above parameters.

Referring to FIG. 21, the antenna has a −10 dB impedance bandwidth of 580 MHz (ranging from 3.22 GHz to 3.80 GHz). The S11 graph shows two line-polarized resonant peaks, which are excited due to the notches in the radiating patches. FIG. 22 shows axial ratio curves for the +z direction and the −z direction. The axial ratio band width at 3 dB for the +z direction is 80 MHz (ranging from 3.56 GHz to 3.64 GHz). The axial ratio band width at 3 dB far the −z direction is 120 MHz (ranging from 3.54 GHz to 3.66 GHz). As shown is FIG. 22, the axial ratio curves for the +z direction and the −z direction do not completely overlay with each other, due to the differences in sizes of the patches and sizes of the notches in the radiating patches. The best circular polarization is achieved at 3.6 GHz. FIG. 23 shows the antenna left-handed polarized radiation pattern at a frequency point of 3.6 GHZ, FIG. 24 shows the antenna right-handed polarized radiation pattern at a frequency point of 3.6 GHz. As shown in FIG. 23 and FIG. 24, the antenna is a right-handed circularly polarized antenna with bidirectional radiation. The overall cross-polarization is very low, e.g., less than −23 das. The asymmetry between the left-handed polarized radiation pattern and the right-handed polarized radiation pattern is due to the different feeding mechanisms. Referring to FIG. 25, the peak values of right-handed polarization gains are 1.9 dBi (+z direction) and 2.2 dBi (−z direction), respectively.

The antenna depicted in FIG. 20A to FIG. 20F has a much smaller axial ratio band width at 3 dB, as compared to the antenna depicted in FIG. 8A to FIG. 8F. This is due to the decreased size of the slot. A slot with a decreased size weakens the aperture coupling, leading to mismatched polarization between the forward radiation and the backward radiation. Nonetheless, the 3 dB axial ratio bandwidth of the antenna depicted is FIG. 20A to FIG. 20F still partially covers the n78 band, and the overall cross-polarization is very low.

Figure 26A:
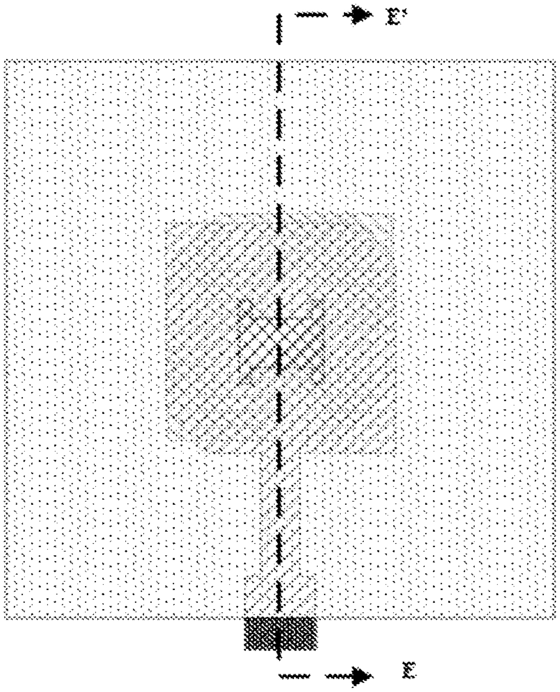
FIG. 26A is a plan view of an antenna in some embodiments according to the present disclosure.
Figure 26B:
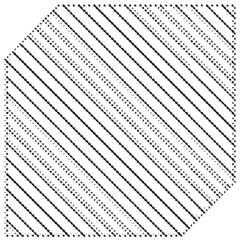
FIG. 26B illustrates the structure of a second radiating patch in an antenna depicted in FIG. 26A.
Figure 26C:
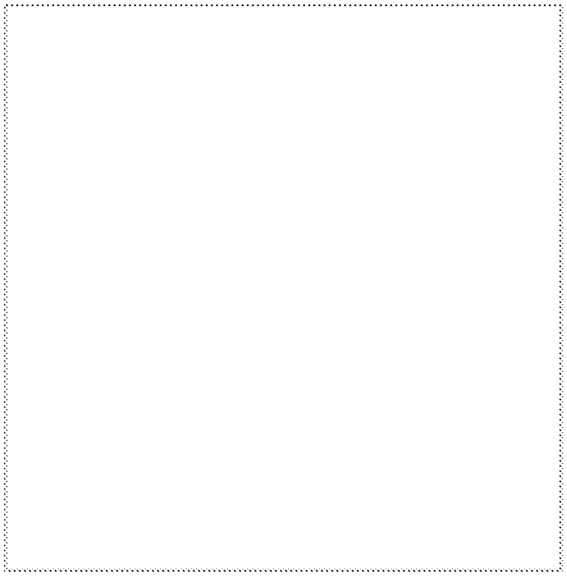
FIG. 26C illustrates the structure of's second dielectric layer in an antenna depicted in FIG. 26A.
Figure 26D:
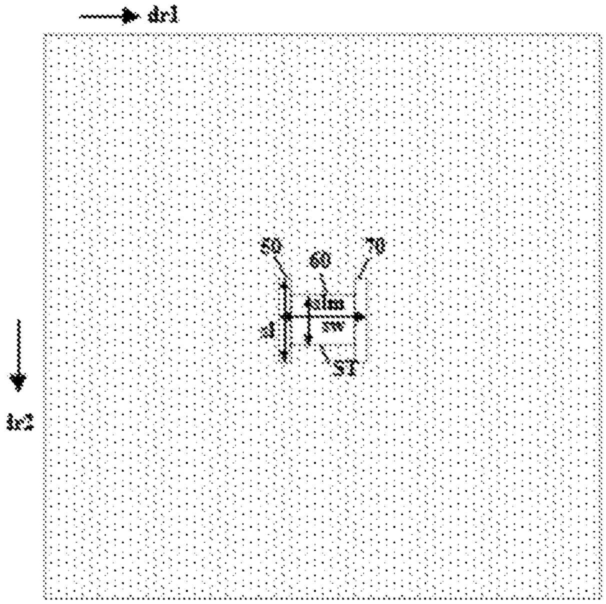
FIG. 26D illustrates the structure of a ground plate in an antenna depicted in FIG. 26A.
Figure 26E:
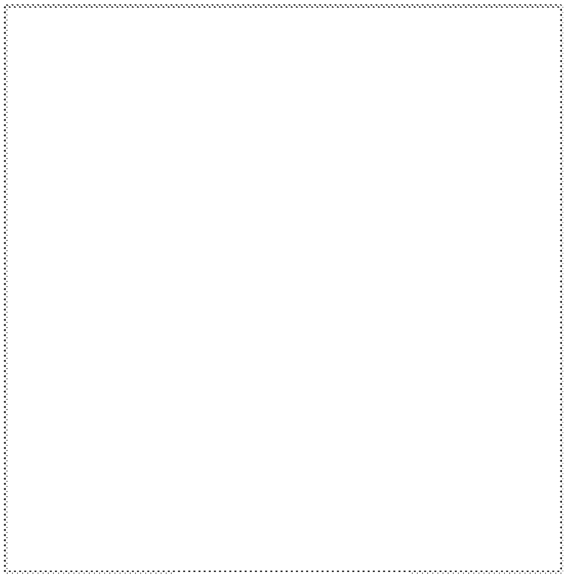
FIG. 26E illustrates the structure of a first dielectric layer in an antenna depicted in FIG. 26A.
Figure 26F:
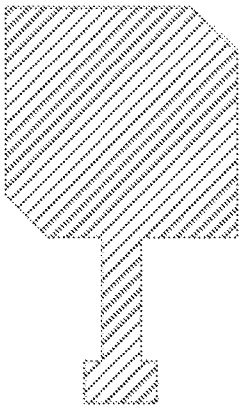
FIG. 26F illustrates the structure of a microstrip feed line and a first radiating patch in an antenna depicted in FIG. 26A.

FIG. 26A is a plan view of an antenna in some embodiments according to the present disclosure. FIG. 26B illustrates the structure of a second radiating patch in an antenna depicted in FIG. 26A. FIG. 26C illustrates the structure of a second dielectric layer in as antenna depicted in FIG. 26A. FIG. 26D illustrates the structure of a ground plate in an antenna depicted in FIG. 26A. FIG. 26E illustrates the structure of a first dielectric layer in an antenna depicted in FIG. 26A. FIG. 26F illustrates the structure of a microstrip feed line and a first radiating patch in an antenna depicted in FIG. 26A. The antenna depicted in FIG. 26A to FIG. 26F differs from the antenna depicted in FIG. 8A to FIG. 8F a shapes and sizes of the slot ST. In the antenna depicted in FIG. 8A to FIG. 8F, the slot ST has a rectangular shape. In the antenna depicted in FIG. 26A to FIG. 26F, the slot ST has a shape comprising, sequentially along a first direction dr1, a first rectangular shape 50, a second rectangular shape 60, and a third rectangular shape 70. Along a second direction del perpendicular to the first direction dr1, a length of the second rectangular shape 60 is smaller than a length of the first rectangular shape 50 and smaller than a length of the third rectangular shape 70. Overall the slot ST has as H-shape. The maximum slot width sw (e.g., 7 mm) of the slot ST in the antenna depicted in FIG. 26A to FIG. 26F is smaller than the maximum slot width sw (e.g., 9 mms) of the slot ST is the antenna depicted in FIG. 8A to FIG. 8F. The maximum slot length sl (e.g., 7 mm) of the slot ST in the antenna depicted in FIG. 26A to FIG. 26F is greater than the maximum slot width sw (e.g., 4 mm) of the slot ST is the antenna depicted in FIG. 8A to FIG. 8F. A minimum slot length sim (e.g., 4 mms) of the slot ST in the antenna depicted is FIG. 26A to FIG. 26F is the same as the minimum slot width (e.g., 4 mm) of the slot ST in the antenna depicted in FIG. 8A to FIG. 8F.

Figure 27:
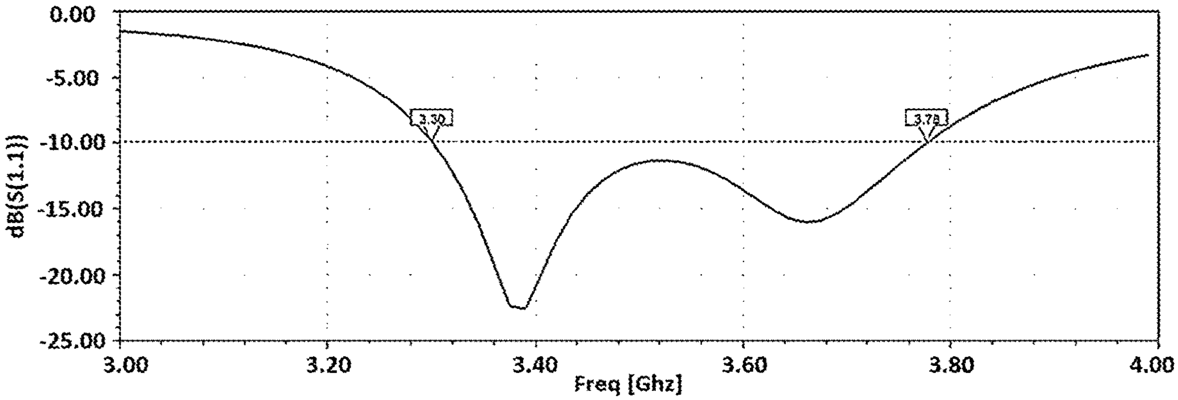
FIG. 27 illustrates an S11 graph of the antenna depicted is FIG. 26A.
Figure 28:
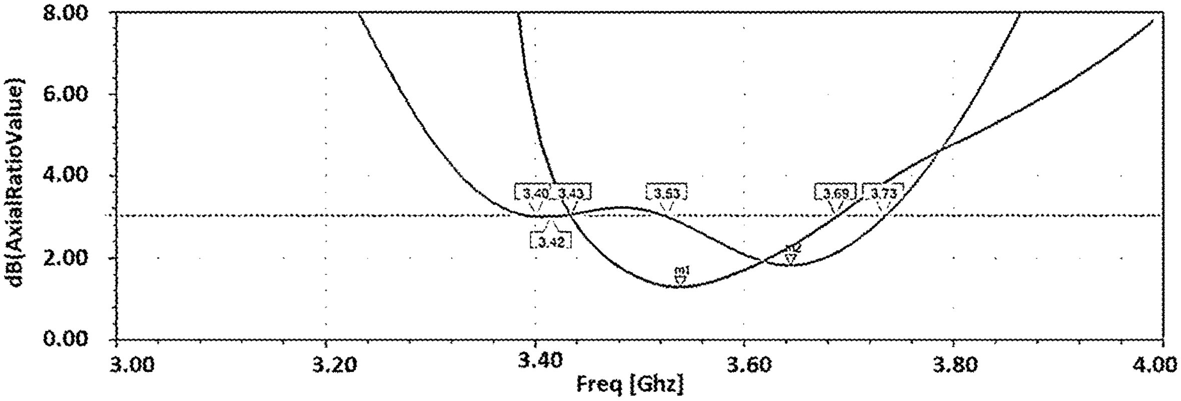
FIG. 28 illustrates an axial ratio graph of the antenna depicted in FIG. 264.
Figure 29:
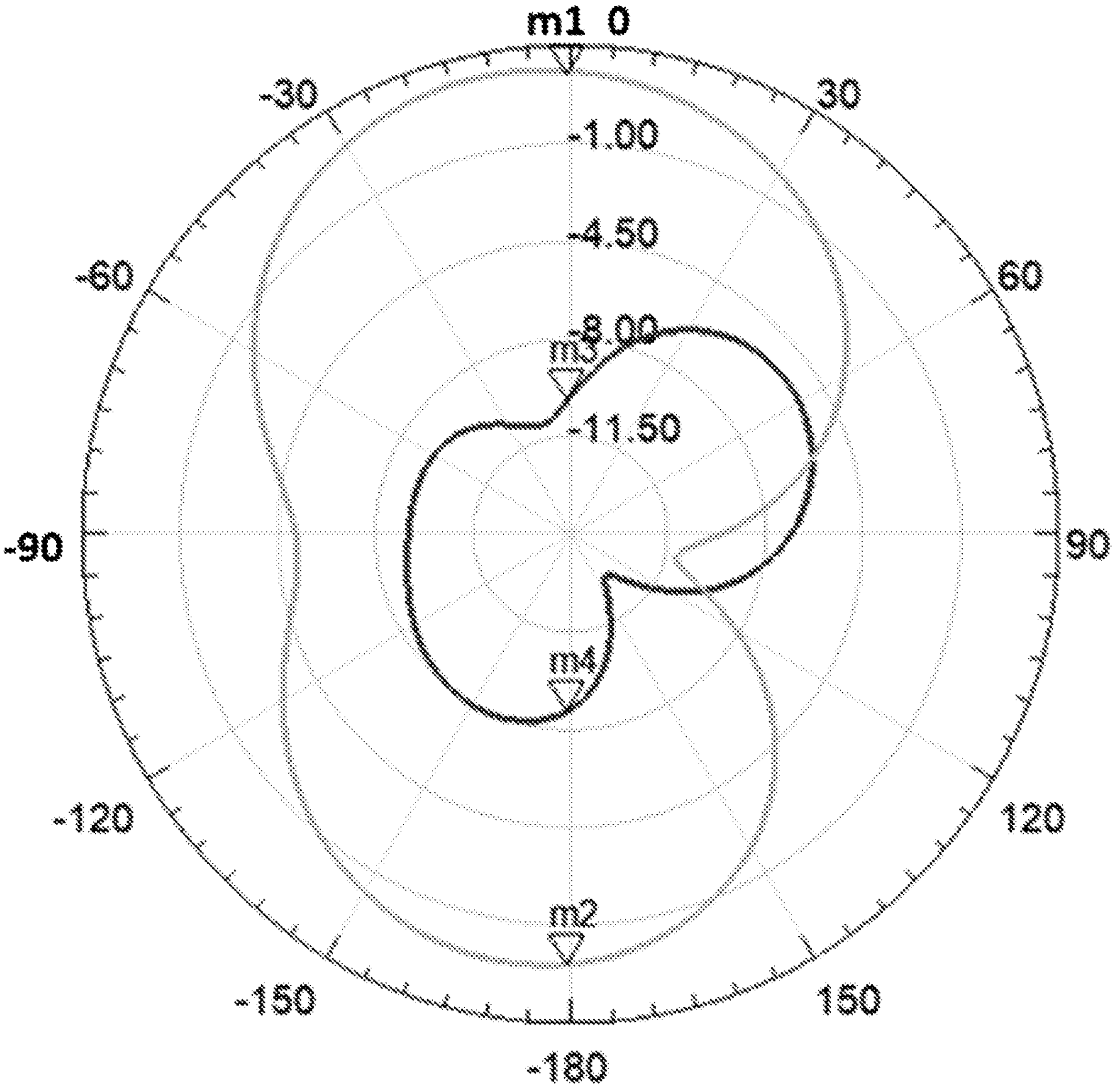
FIG. 29 illustrates an antenna radiation pattern of the antenna depicted in FIG. 26A is a XOZ place at 3.6 GHz.
Figure 30:
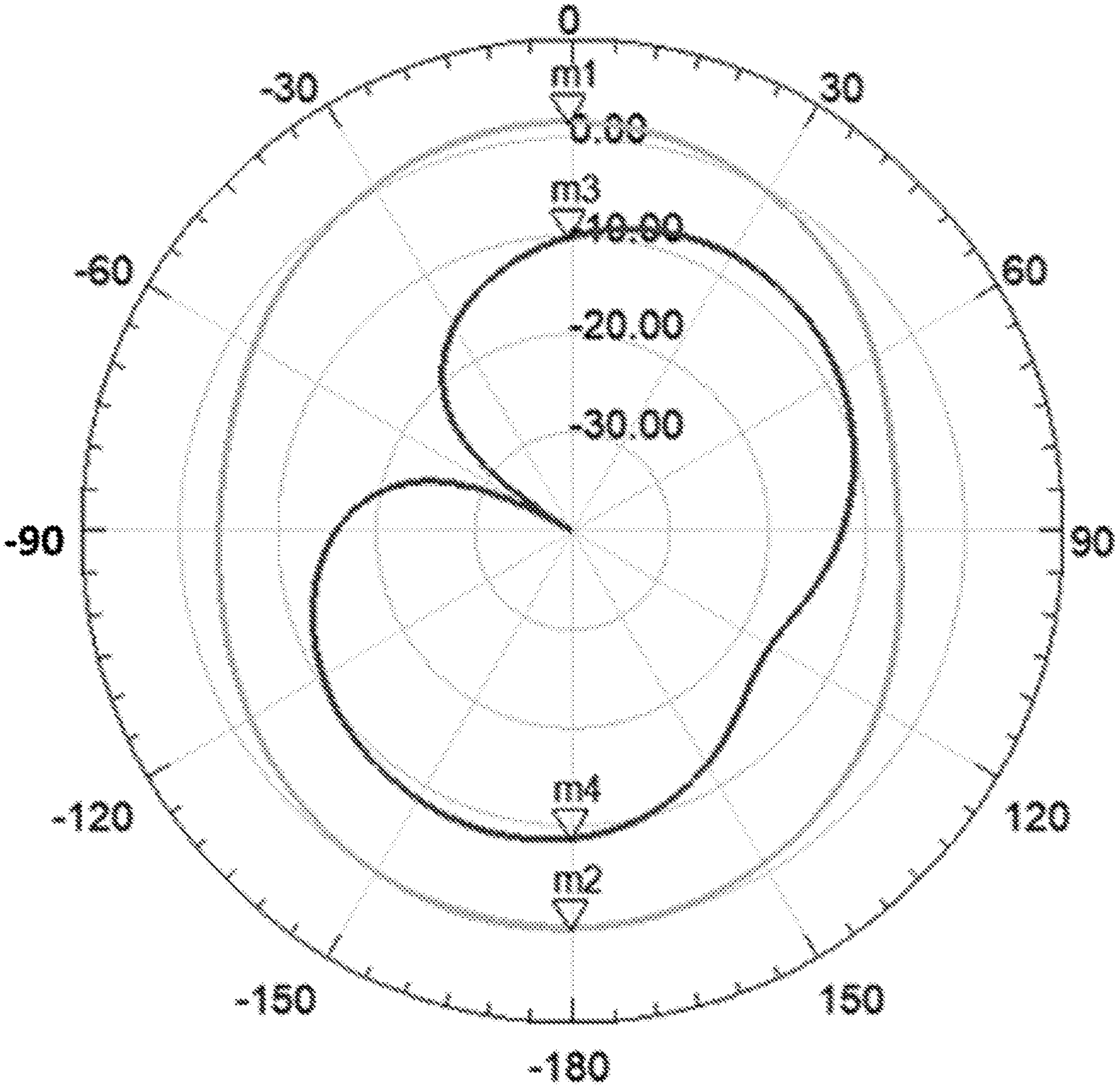
FIG. 30 illustrates an antenna radiation pattern of the antenna depicted in FIG. 26A in a YOZ plane at 3.6 GHz.
Figure 31:
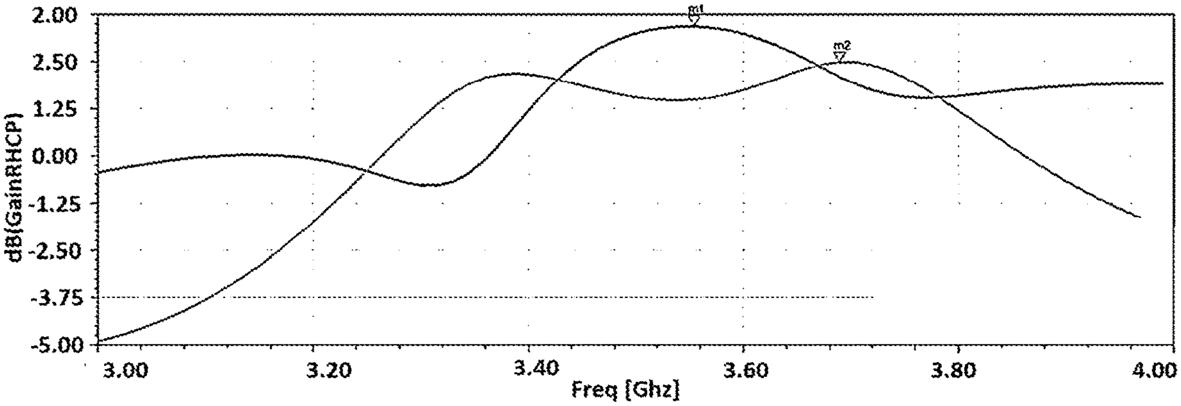
FIG. 31 illustrates a right-handed polarisation gain curve of the antenna depicted in FIG. 26A.

FIG. 27 illustrates an S11 graph of the antenna depicted in FIG. 26A. FIG. 28 illustrates aw axial ratio graph of the antenna depicted in FIG. 26A. FIG. 29 illustrates aw antenna radiation pattern of the antenna depicted in FIG. 26A in a XOZ plane at 3.6 GHz. FIG. 30 illustrates au antenna radiation pattern of the antenna depicted in FIG. 26A is a YOZ plane at 3.6 GHz FIG. 31 illustrates s right-handed polarization gain curve of the antenna depicted in FIG. 26A. In one specific example, the antenna has an overall thickness of $0.07\lambda_0$, wherein $\lambda_0$ stands for a wavelength in vacuum of a radiation produced by the antenna. The ground plate, the first radiation patch, the second radiation patch are made of a metallic material such as copper. The first dielectric layer and the second dielectric layer have a dielectric constant of 2.5, a dissipation factor of 0.001, and a thickness of 3 mm. The first radiating patch and the second radiating patch have a thickness of 18 μm. The radiation generated by the antenna has a central frequency point f0 of 3.5 GHz. The first radiating patch has a dimension of 18.5 mm×18.5 mm. The second radiating patch has a dimension of 18.0 mm×18.0 mm. The respective first truncated side of the first radiating patch has a length of 4.67 mm. The respective second truncated side of the second radiating patch has a length of 5.80 mm. The first dielectric layer, the second dielectric layer, and the ground plate have a dimension of 45.0 mm×45.0 mm. The slot has dimension of 7.0 mm×7.0 mm, and was an H-shape as described above. The microstrip feed line has a dimension of 3.25 mm×5.8 mm. The impedance transformation line has a dimension of 3.0 mm×10.0 mm. FIG. 27 to FIG. 31 show data obtained is an antenna having the above parameters.

Referring to FIG. 27, the antenna has a −10 dB impedance bandwidth of 480 MHz (ranging from 3.30 GHz to 3.78 GHz). The S11 graph shows two line-polarized resonant peaks, which are excited due to the notches in the radiating patches. FIG. 28 shows axial ratio curves for the +z direction and the −z direction. The axial ratio band width at 3 dB for the +z direction is 260 MHz (ranging from 3.43 GHz to 3.69 GHz). The axial ratio band width at 3 dB for the −z direction is 200 MHz (ranging from 3.53 GHz to 3.73 GHz). As shown in FIG. 28, the axial ratio curves for the +z direction and the −z direction do not completely overlay with each other, due to the differences in sizes of the patches and sizes of the notches in the radiating patches. The best circular polarization is achieved at 3.6 GHz. FIG. 29 shows the antenna left-handed polarized radiation pattern at a frequency point of 3.6 GHZ, FIG. 30 shows the antenna right-handed polarized radiation pattern at a frequency point of 3.6 GHz. As shown in FIG. 29 and FIG. 30, the antenna is a right-handed circularly polarised antenna with bidirectional radiation. The overall cross-polarization is very low, e.g., less than −8 dBi. The asymmetry between the left-handed polarized radiation pattern and the right-handed polarized radiation pattern is due to the different feeding mechanisms. Referring to FIG. 31, the peak values of right-handed polarization gains are 1.7 dBi (+z direction) and 1.0 dBi (−z direction), respectively.

The antenna depicted in FIG. 26A to FIG. 26F has a much smaller axial ratio band width at 3 dB, as compared to the antenna depicted in FIG. 8A to FIG. 8F. This is due to the decreased size of the slot. A slot with a decreased size weakens the aperture coupling, leading to mismatched polarization between the forward radiation and the backward radiation. Nonetheless, the 3 dB axial ratio bandwidth of the antenna depicted in FIG. 26A to FIG. 26F still partially covers the n78 band, and the overall cross-polarization is very low.

Figure 32A:
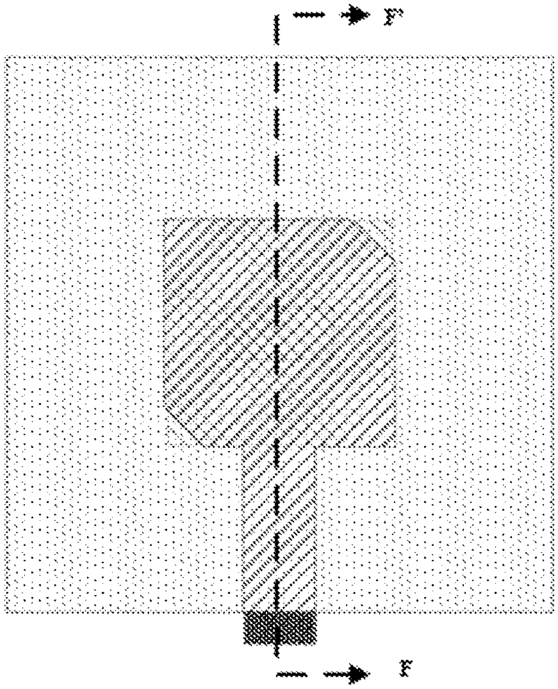
FIG. 32A is a plan view of an antenna in some embodiments according to the present disclosure.
Figure 32B:
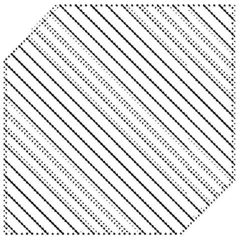
FIG. 32B illustrates the structure of a second radiating patch as an antenna depicted is FIG. 32A.
Figure 32C:
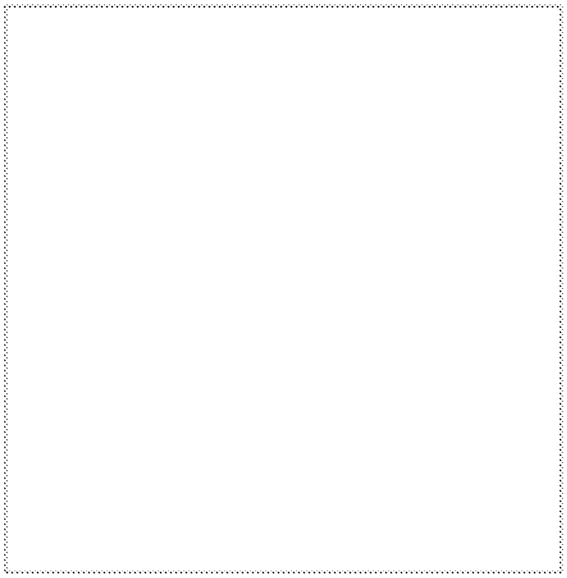
FIG. 32C illustrates the structure of a second dielectric layer in an antenna depicted in FIG. 32A.
Figure 32D:
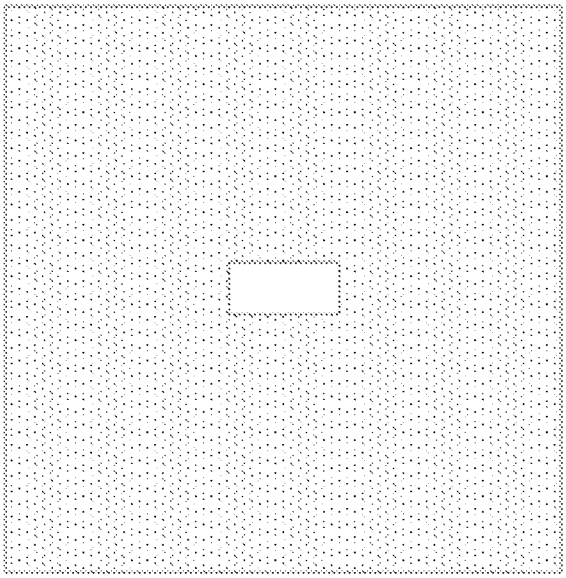
FIG. 32D illustrates the structure of a ground plate in an antenna depicted in FIG. 32A.
Figure 32E:
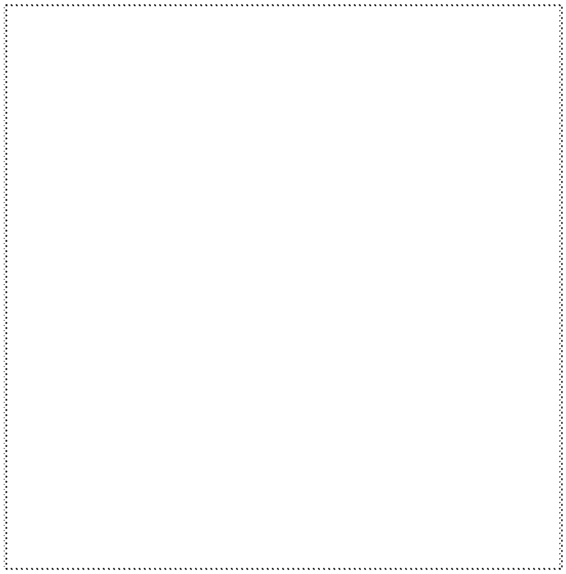
FIG. 32F illustrates the structure of a microstrip feed line and a first radiating patch in an antenna depicted in FIG. 32A.
Figure 32F:
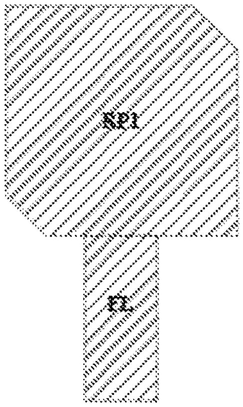

FIG. 32A is a plan view of an antenna in some embodiments according to the present disclosure. FIG. 323 illustrates the structure of a second radiating patch in an antenna depicted in FIG. 32A. FIG. 32C illustrates the structure of a second dielectric layer in an antenna depicted in FIG. 32A. FIG. 32D illustrates the structure of a ground plate in an antenna depicted in FIG. 32A. FIG. 32E illustrates the structure of a first dielectric layer in an antenna depicted in FIG. 32A. FIG. 32F illustrates the structure of a microstrip feed line and a first radiating patch is an antenna depicted is FIG. 32A. The antenna depicted in FIG. 32A to FIG. 32F differs from the antenna depicted in FIG. 8A to FIG. 8F is that the antenna depicted in FIG. 32A to FIG. 32F does not have an impedance transformation line. In the antenna depicted in FIG. 32A to FIG. 32F, the microstrip feed line FL is directly connected to the first radiating patch RP1 without an impedance transformation line.

Figure 33:
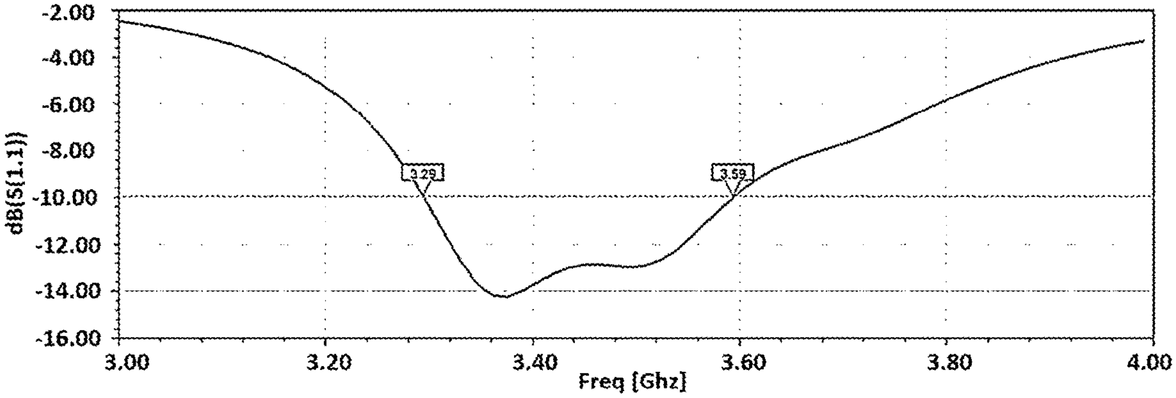
FIG. 33 illustrates au S11 graph of the antenna depicted in FIG. 32A.
Figure 34:
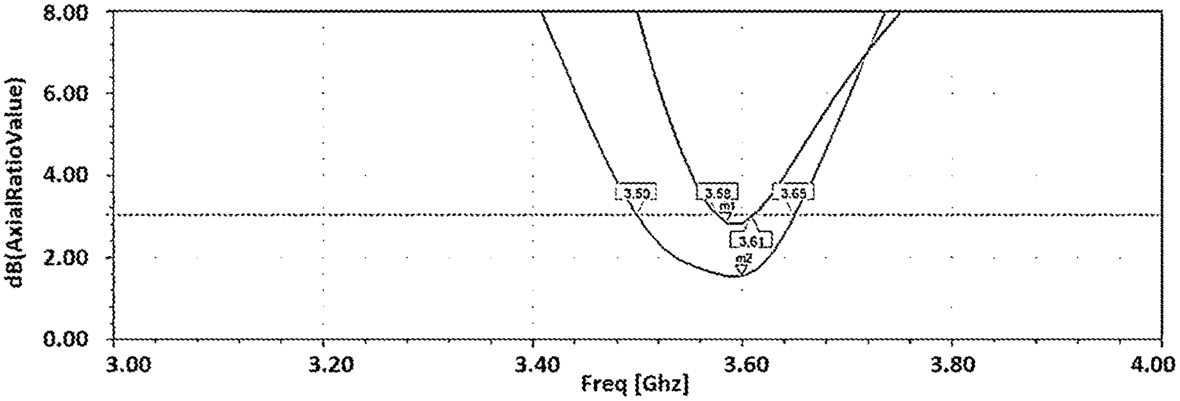
FIG. 34 illustrates an axial ratio graph of the antenna depicted in FIG. 32A.
Figure 35:
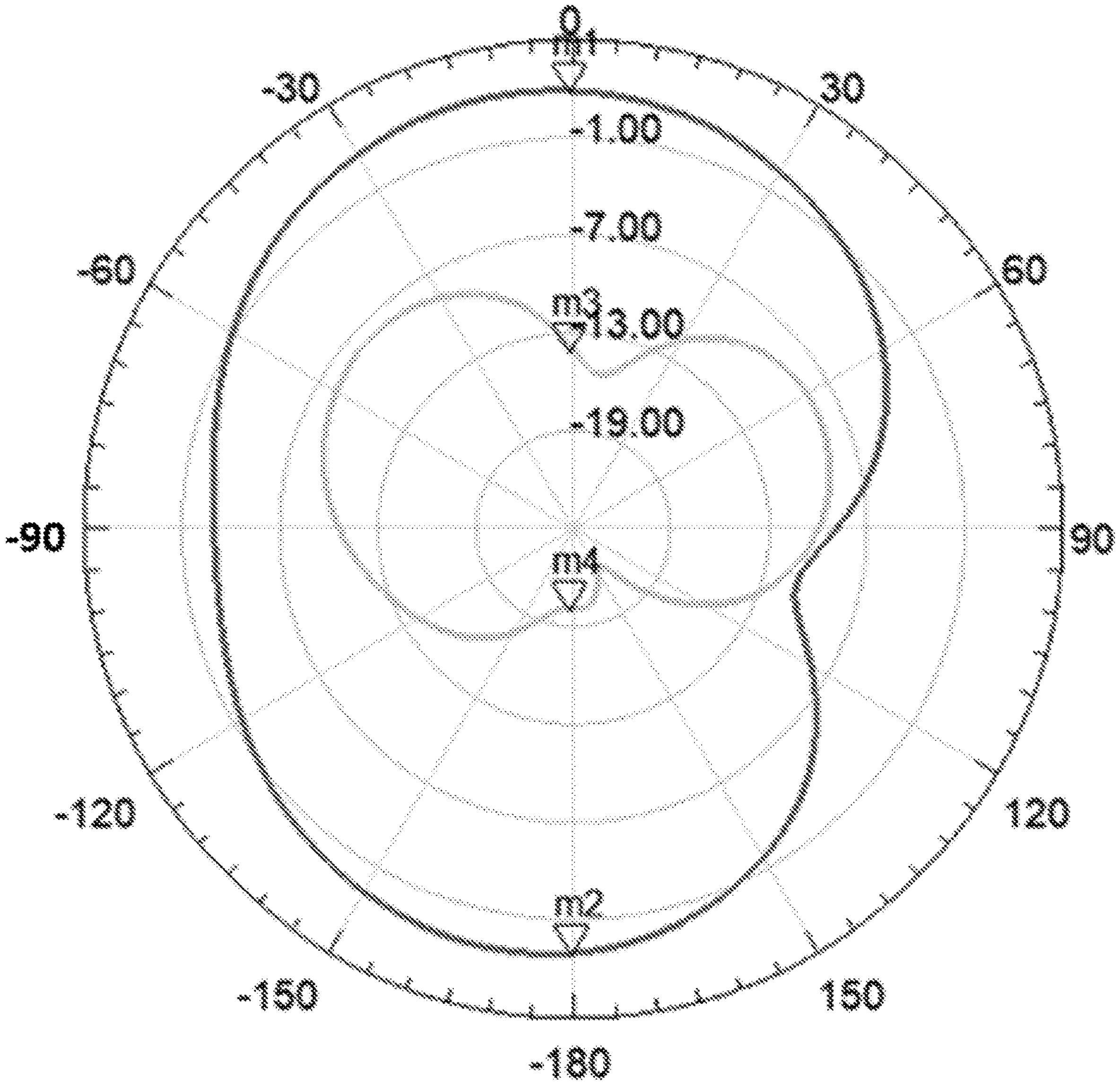
FIG. 35 illustrates an antenna radiation pattern of the antenna depicted in FIG. 32A in a XOZ plane at 3.6 GHz.
Figure 36:
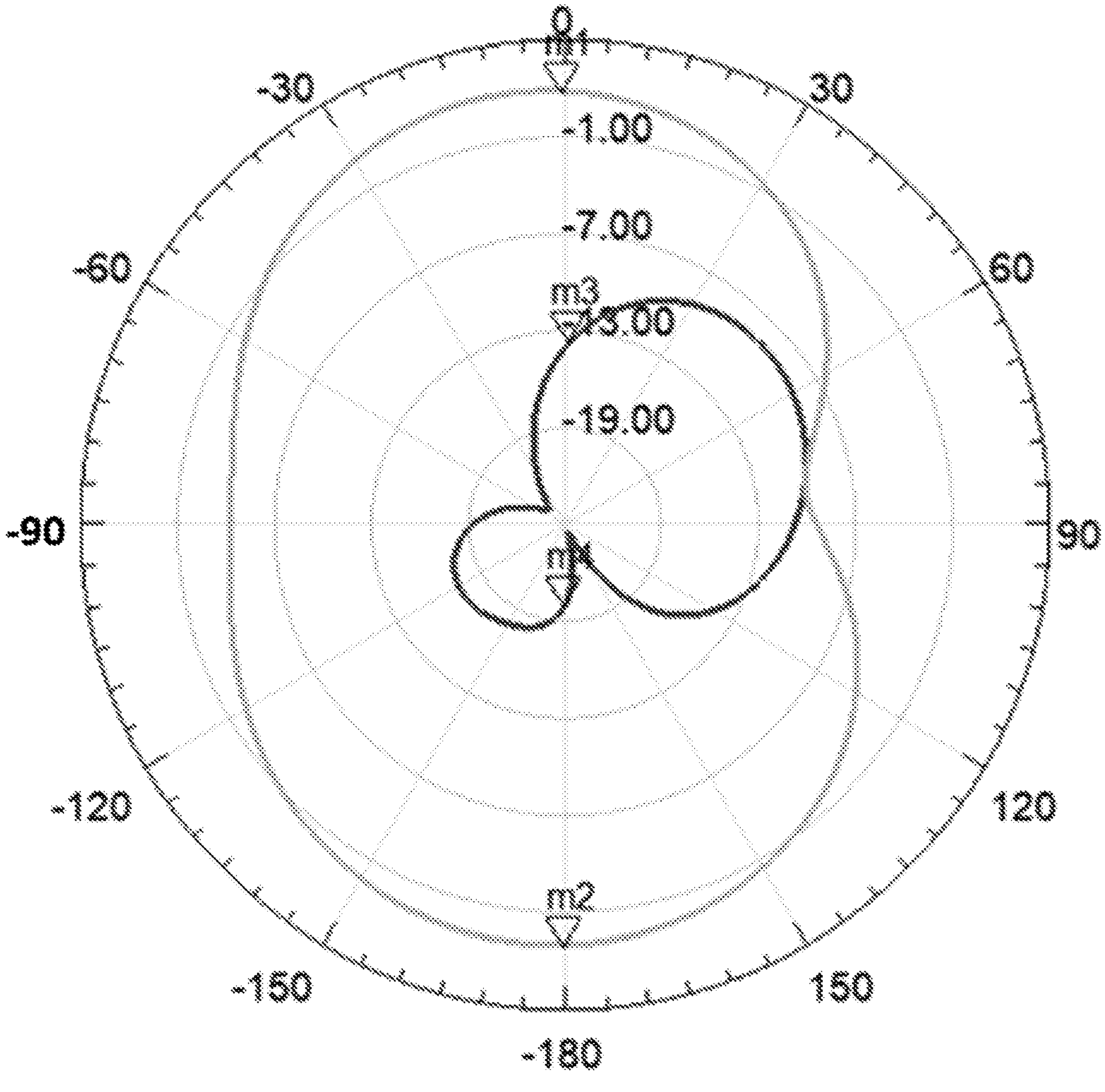
FIG. 36 illustrates an antenna radiation pattern of the antenna depicted in FIG. 32A in a YOZ place at 3.6 GHz.
Figure 37:
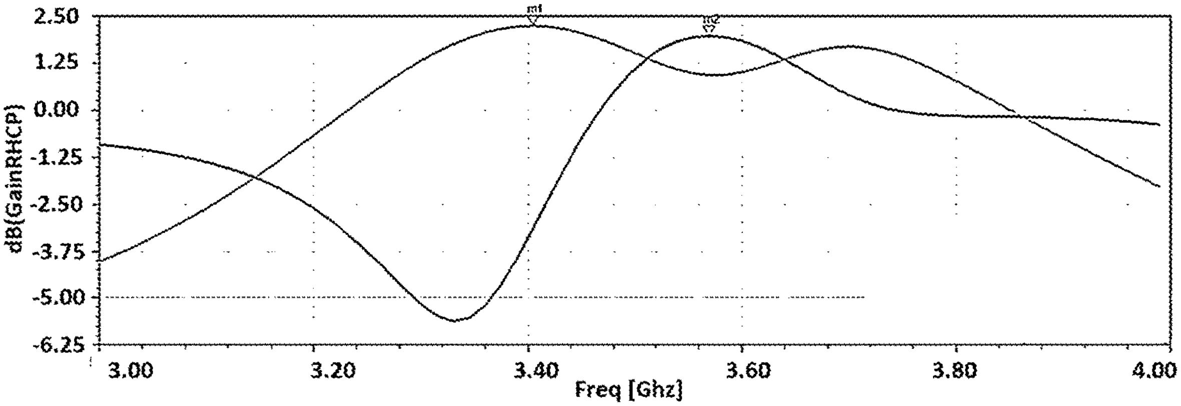
FIG. 37 illustrates a right-handed polarization gain curve of the antenna depicted in FIG. 32A.

FIG. 33 illustrates an S11 graph of the antenna depicted in FIG. 32A. FIG. 34 illustrates aw axial ratio graph of the antenna depicted in FIG. 32A. FIG. 35 illustrates aw antenna radiation pattern of the antenna depicted in FIG. 32A in a XOZ plane at 3.6 GHZ, FIG. 36 illustrates an antenna radiation pattern of the antenna depicted in FIG. 32A is a YOZ plane at 3.6 GHz. FIG. 37 illustrates a right-handed polarization gain curve of the antenna depicted in FIG. 32A. In one specific example, the antenna has an overall thickness of $0.07\lambda_0$, wherein $\lambda_0$ stands for a wavelengths in vacuum of a radiation produced by the antenna. The ground plate, the first radiation patch, the second radiation patch are made of a metallic material such as copper. The first dielectric layer and the second dielectric layer have a dielectric constant of 2.5, a dissipation factor of 0.001, and a thickness of 3 num. The first radiating patch and the second radiating patch have a thickness of 18 μm. The radiation generated by the antenna has a central frequency point f0 of 3.5 GHz. The first radiating patch has a dimension of 18.5 mm×18.5 mm. The second radiating patch has a dimension of 18.0 mm×18.0 mm. The respective first truncated side of the first radiating patch has a length of 4.67 mm. The respective second truncated side of the second radiating patch has a length of 5.80 mm. The first dielectric layer, the second dielectric layer, and the ground plate have a dimension of 45.0 mm×45.0 mm. The slot has dimension of 4.0 mm×9.0 mm. The microstrip feed line has a dimension of 3.25 mm×5.8 mm FIG. 33 to FIG. 37 show data obtained in an antenna having the above parameters.

Referring to FIG. 33, the antenna has a −10 dB impedance bandwidth of 300 MHz (ranging from 3.29 GHz to 3.59 GHz). The S11 graph shows two lie-polarized resonant peaks, which are excited due to the notches in the radiating patches. FIG. 34 shows axial ratio curves for the +z direction and the −z direction. The axial ratio band width at 3 dB for the +z direction is 30 MHz (ranging from 3.58 GHz to 3.61 GHz). The axial ratio band width at 3 dB for the −z direction is 150 MHz (ranging from 3.50 GHz to 3.65 GHz). As shown in FIG. 34, the axial ratio curves for the +z direction and the −z direction do not completely overlay with each other, due to the differences in sizes of the patches and sizes of the watches in the radiating patches. The best circular polarization is achieved at 3.6 GHz. FIG. 35 shows the antenna left-handed polarized radiation pattern at a frequency point of 3.6 GHz, FIG. 36 shows the antenna right-handed polarised radiation patters at a frequency point of 3.6 GHz. As shown in FIG. 35 and FIG. 36, the antenna is a right-handed circularly polarized antenna with bidirectional radiation. The overall cross-polarization is very low, e.g., less than −15 di. The symmetry between the left-handed polarized radiation pattern and the right-handed polarized radiation pattern is due to the different feeding mechanisms. Referring to FIG. 37, the peak values of right-handed polarization gains are 2.0 dBi (+z direction) and 2.2 dBi (−z direction), respectively.

The antenna depicted in FIG. 32A to FIG. 32F has a much smaller axial ratio band widths at 3 dB (particularly for the +z direction), as compared to the antenna depicted in FIG. 8A to FIG. 8F. The antenna can still achieve the right-handed circular polarization, albeit in a narrower frequency range. Nonetheless, the 3 dB axial ratio bandwidth of the antenna depicted in FIG. 32A to FIG. 32F still partially covers the n78 band, and the overall cross-polarization is very low.

Referring to FIG. 1A to FIG. 1F, FIG. 2, FIG. 8A to FIG. 8F, FIG. 14A to FIG. 14F, FIG. 20A to FIG. 20F, FIG. 26A to FIG. 26F, and FIG. 32A to FIG. 32F, in some embodiments, orthographic projections of the first radiating patch RP1, the second radiating patch RP2, and the slot ST on the first dielectric layer DL1 at least partially overlap with each other. Optionally, as orthographic projection of the fast radiating patch RP1 on the first dielectric layer DL1 covers an orthographic projection of the slot ST on the first dielectric layer DL1. Optionally, an orthographic projection of the second radiating patch RP2 on the first dielectric layer DL1 covers an orthographic projection of the slot ST on the first dielectric layer DL1.

In some embodiments, an orthographic projection of the slot ST on the first dielectric layer DL1 covers a center of as orthographic projection of the first radiating patch RP1 on de first dielectric layer DL1. Optionally, as orthographic projection of the slot ST on the first dielectric layer DL1 covers a center of an orthographic projection of the second radiating patch RP2 on the first dielectric layer DL1.

In some embodiment, the first diagonal line da1 and the second diagonal line da2 cross over each other, orthographic projections of the first diagonal line da1 and the second diagonal line da2 on the first dielectric layer DL1 intersect with each other at an intersection point. Optionally, an orthographic projection of the slot ST on the first dielectric layer DL1 covers the intersection post.

In some embodiments, centers of orthographic projections of the first radiating patch RP1, the second radiating patch RP2, and the slot ST on the first dielectric layer DL1 substantially overlap with each other, for example, spaced apart from each offer by a distance no wore thaw 1 mm, e.g., no more than 0.5 mm, no more than 0.4 mm, no more than 0.3 mm, no more than 0.2 mm, no more than 0.1 mm, or so more than 0.0.5 mm.

The present antenna is particularly suitable for indoor mobile communication mobile communication in a long hallway, or mobile communication in a long tunnel. In these situations, issues such as a high degree of signal penetration loss make mobile communication difficult. Conventional omni-directional antennas often do not have sufficient coverage is these situation, suffer from instable signal distribution and blind areas. The antenna according to the present disclosure has the characteristics of circularly polarized bidirectional radiation, masking it suitable for use in underground mines, tunnels, and long hallways, as well as a relay antenna for relaying the signal of an adjacent antenna to other receiving antennas.

In another aspect, the present disclosure provide an electronic apparatus. In some embodiments, the electronic apparatus includes an antenna described herein, and one or more circuits. In one example, the electronic apparatus is a display apparatus. In some embodiments the display apparatus includes a display panel and aw antenna described herein connected to the display panel. Examples of appropriate display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled is this at. The embodiments are choses and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant w their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been gives. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An antenna, comprising:

a ground plate, and a slot extending through the ground plate;

a first dielectric layer on the ground plate and the slot;

a microstrip feed line and a first radiating patch on a side of the first dielectric layer away from the ground plate, the first radiating patch being coupled to the microstrip feed line and configured to receive a signal from the microstrip feed line;

a second dielectric layer on a side of the ground plate and the slot away from the first dielectric layer, the first radiating patch, and the microstrip feed line; and a second radiating patch on a side of the second dielectric layer away from the ground plate, the second radiating patch being configured to receive a signal by aperture coupling through the slot;

wherein the slot has a shape comprising, sequentially along a first direction, a first rectangular shape, a first trapezoidal shape, a second trapezoidal shape, and a second rectangular shape;

short sides of the first trapezoidal shape and the second trapezoidal shape are connected to each other; and along a second direction perpendicular to the first direction, lengths of the first rectangular shape and the second rectangular shape are substantially the same as lengths of long sides of the first trapezoidal shape and the second trapezoidal shape.

2. The antenna of claim 1, wherein the first radiating patch has a first parallelogram shape with a first notch and a second notch truncating two corners of the first parallelogram shape on two opposite sides of a first diagonal line, respectively;

the second radiating patch has a second parallelogram shape with a third notch and a fourth notch truncating two corners of the second parallelogram shape on two opposite sides of a second diagonal line, respectively; and the first diagonal line and the second diagonal line cross over each other.

3. The antenna of claim 2, wherein corners of the first parallelogram shape along the second diagonal line remain untruncated; and corners of the second parallelogram shape along the first diagonal line remain untruncated.

4. The antenna of claim 2, wherein the first parallelogram shape has first truncated sides along the first notch and the second notch, respectively;

the second parallelogram shape has second truncated sides along the third notch and the fourth notch, respectively; and a length of a respective first truncated side is smaller than a length of a respective second truncated side.

5. The antenna of claim 4, wherein the length of the respective first truncated side is smaller than the length of the respective second truncated side by 5% to 35%.

6. The antenna of claim 2, wherein the first parallelogram shape with the first notch and the second notch are a first square shape with the first notch and the second notch; and the second parallelogram shape with the third notch and the fourth notch are a second square shape with the third notch and the fourth notch.

7. The antenna of claim 2, wherein, along a first direction, a first maximum width of the first parallelogram shape is greater than a second maximum width of the second parallelogram shape; and along a second direction perpendicular to the first direction, a first maximum length of the first parallelogram shape is greater than a second maximum length of the second parallelogram shape.

8. The antenna of claim 7, wherein the first maximum width is greater than the second maximum width by 0.1% to 10%; and the first maximum length is greater than the second maximum length by 0.1% to 10%.

9. The antenna of claim 3, wherein orthographic projections of corners of the first parallelogram shape along the second diagonal line on the first dielectric layer is at least partially non-overlapping with an orthographic projection of the second parallelogram shape on the first dielectric layer; and orthographic projections of corners of the second parallelogram shape along the first diagonal line on the first dielectric layer is at least partially non-overlapping with an orthographic projection of the first parallelogram shape on the first dielectric layer.

10. The antenna of claim 1, wherein, along a first direction, the slot has a maximum slot width;

along a second direction perpendicular to the first direction, the slot has a maximum slot length; and a ratio of the maximum slot width to the maximum slot length is in a range of 4:1 to 1.5:1.

11. The antenna of claim 10, wherein the first radiating patch has a first parallelogram shape with a first notch and a second notch truncating two corners of the first parallelogram shape on two opposite sides of a first diagonal line, respectively;

the second radiating patch has a second parallelogram shape with a third notch and a fourth notch truncating two corners of the second parallelogram shape on two opposite sides of a second diagonal line, respectively;

along the first direction, a ratio of the maximum slot width to a first maximum width of the first parallelogram shape or to a second maximum width of the second parallelogram shape is in a range of 1:1.5 to 1:2.5; and along the second direction, a ratio of the maximum slot length to a first maximum length of the first parallelogram shape or a second maximum length of the second parallelogram shape is in a range of 1:2.5 to 1:6.5.

12. The antenna of claim 1, further comprising an impedance transformation line configured to perform impedance matching;

wherein the impedance transformation line connects the microstrip feed line to the first radiating patch.

13. The antenna of claim 12, wherein the impedance transformation line has a rectangular shape.

14. The antenna of claim 12, wherein the impedance transformation line has a first side connected to the microstrip feed line, a second side connected to the first radiating patch, and a third side and a fourth side between the first side and the second side; and the third side and the first side, the third side and the second side, the fourth side and the first side, the fourth side and the second side, are connected by curved sides.

15. The antenna of claim 1, wherein the microstrip feed line is directly connected to the first radiating patch without an impedance transformation line.

16. The antenna of claim 1, wherein an orthographic projection of the slot on the first dielectric layer covers a center of an orthographic projection of the first radiating patch on the first dielectric layer; and the orthographic projection of the slot on the first dielectric layer covers a center of an orthographic projection of the second radiating patch on the first dielectric layer.

17. The antenna of claim 1, wherein the antenna is configured to be a right-handed circularly polarized antenna with bidirectional radiation.

18. An electronic apparatus, comprising the antenna of claim 1.

19. An antenna, comprising:

a ground plate, and a slot extending through the ground plate;

a first dielectric layer on the ground plate and the slot;

a microstrip feed line and a first radiating patch on a side of the first dielectric layer away from the ground plate, the first radiating patch being coupled to the microstrip feed line and configured to receive a signal from the microstrip feed line;

a second dielectric layer on a side of the ground plate and the slot away from the first dielectric layer, the first radiating patch, and the microstrip feed line; and a second radiating patch on a side of the second dielectric layer away from the ground plate, the second radiating patch being configured to receive a signal by aperture coupling through the slot;

wherein the slot has a shape comprising, sequentially along a first direction, a first rectangular shape, a second rectangular shape, and a third rectangular shape; and along a second direction perpendicular to the first direction, a length of the second rectangular shape is smaller than a length of the first rectangular shape and smaller than a length of the third rectangular shape.

* * * * *